United States Patent [19]

Herrero et al.

[11] Patent Number: 5,669,420

[45] Date of Patent: Sep. 23, 1997

[54] CASING AND FLEXIBLE TUBULAR CONDUIT COMPRISING SUCH A CASING AND PROCESS FOR PRODUCING IT

[76] Inventors: José Mallen Herrero, 29, Boulevard des Batignolles, 75008 Paris; Guy Le Bail, 29, rue Sacha Guitry, 76480 Yainville; Jany Feret, 57, rue de Grasse Village, 78810 Feucherolles, all of France

[21] Appl. No.: 606,873

[22] PCT Filed: Jul. 29, 1991

[86] PCT No.: PCT/FR91/00626

§ 371 Date: Apr. 23, 1992

§ 102(e) Date: Apr. 23, 1992

[87] PCT Pub. No.: WO92/02751

PCT Pub. Date: Feb. 20, 1992

Related U.S. Application Data

[63] Continuation of Ser. No. 300,526, Sep. 6, 1994, abandoned, which is a continuation of Ser. No. 842,162, Apr. 23, 1992, abandoned.

[30] Foreign Application Priority Data

Jul. 27, 1990 [FR] France ..................... 90 09656
Jul. 29, 1991 [WO] WIPO .................. PCT/FR91/00626

[51] Int. Cl.⁶ ................................................. F16L 11/16
[52] U.S. Cl. .................... 138/135; 138/139; 138/122; 138/154
[58] Field of Search ..................... 138/103, 110, 138/129, 132, 133, 134, 135, 136, 139, 131, 121, 122, 173, 154

[56] References Cited

U.S. PATENT DOCUMENTS

| | | | |
|---|---|---|---|
| 712,418 | 10/1902 | Rudolph | 138/135 |
| 781,560 | 1/1905 | Scognamillo | 138/131 |
| 907,692 | 12/1908 | Hervey | 138/139 |
| 1,145,434 | 7/1915 | Pechstein | 138/135 |
| 1,593,016 | 7/1926 | Campbell | 138/135 |
| 1,954,724 | 4/1934 | Collom . | |
| 2,045,540 | 6/1936 | DeBenedetti | 138/135 |
| 2,066,473 | 1/1937 | Jorgensen | 138/139 |
| 2,118,584 | 5/1938 | Aime | 138/133 |
| 2,402,497 | 6/1946 | Johnson | 138/135 |
| 3,041,855 | 7/1962 | Hanlein | 138/135 |
| 3,204,666 | 9/1965 | Lindsay et al. | 138/139 |
| 3,255,780 | 6/1966 | Squirrell | 138/129 |
| 3,311,133 | 3/1967 | Kinander | 138/139 |
| 3,459,233 | 8/1969 | Webbe | 138/131 |
| 3,495,628 | 2/1970 | Boender | 138/154 |
| 3,687,169 | 8/1972 | Reynard . | |
| 3,771,570 | 11/1973 | Coleman . | |
| 3,811,470 | 5/1974 | Ahlquist | 138/129 |
| 4,377,186 | 3/1983 | Genini et al. | 138/133 |
| 4,531,551 | 7/1985 | Eichelberger et al. | 138/129 |
| 4,567,916 | 2/1986 | Antal et al. | 138/139 |
| 4,706,713 | 11/1987 | Sadamitsu et al. | 138/129 |

FOREIGN PATENT DOCUMENTS

| | | | |
|---|---|---|---|
| 3553 | 12/1900 | Denmark | 138/136 |
| 9795 | 4/1906 | United Kingdom | 138/133 |
| 2143003 | 1/1985 | United Kingdom . | |
| 2169913 | 7/1986 | United Kingdom . | |

*Primary Examiner*—David Scherbel
*Assistant Examiner*—James F. Hook
*Attorney, Agent, or Firm*—Hoffman, Wasson & Gitler

[57] ABSTRACT

The invention has mainly as its object a metal tubular tube (1) comprising hollow compartments (7), and a flexible tubular conduit comprising at least one such tube. The tube according to the invention is characterized by the fact that it comprises at least one hollow channel (7) formed by walls belonging to a strip and spirally wound around an axis (6) of tube (1). The invention applies mainly to the production of flexible tubular conduits for transporting hydrocarbons.

14 Claims, 13 Drawing Sheets

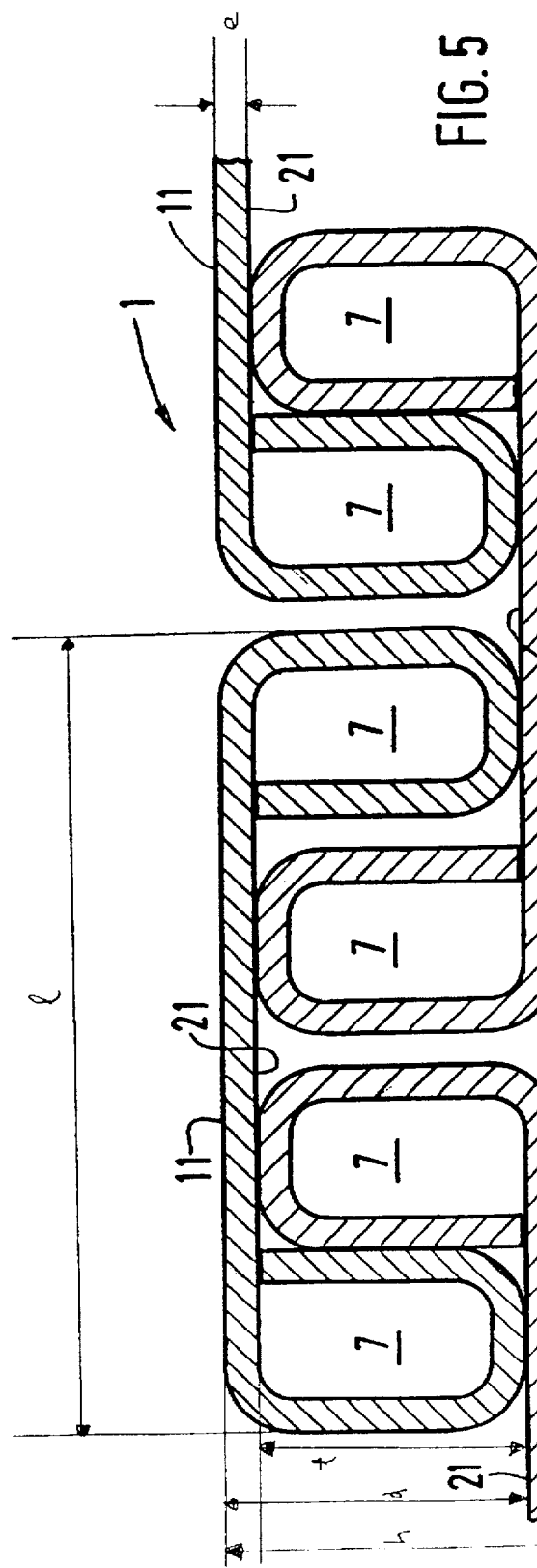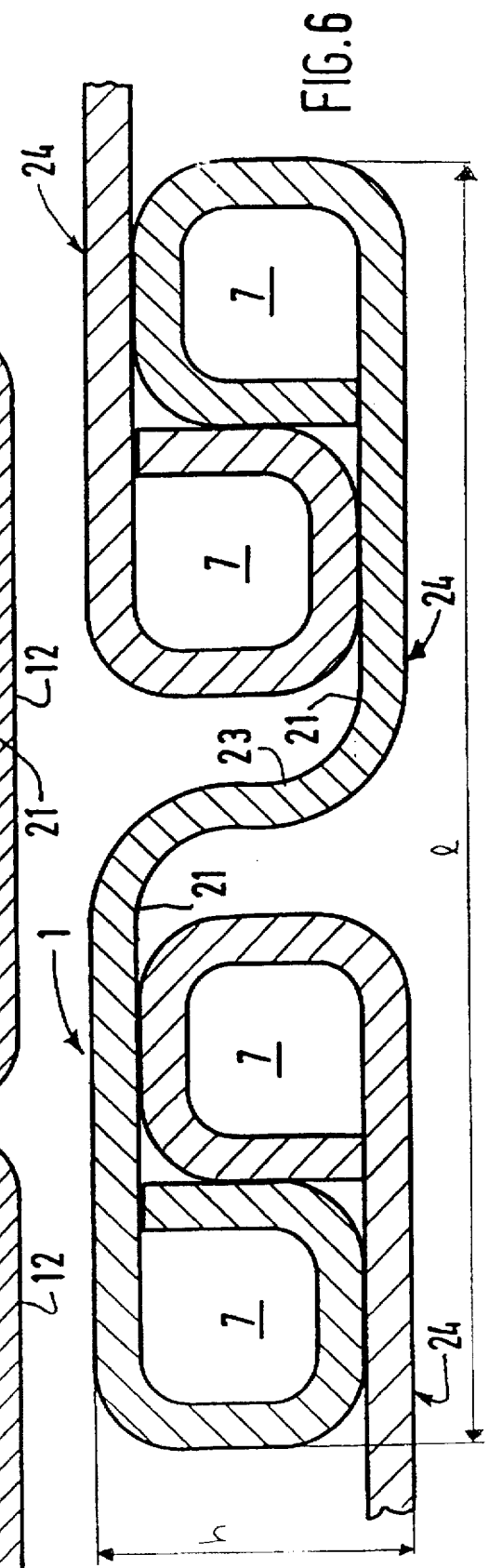

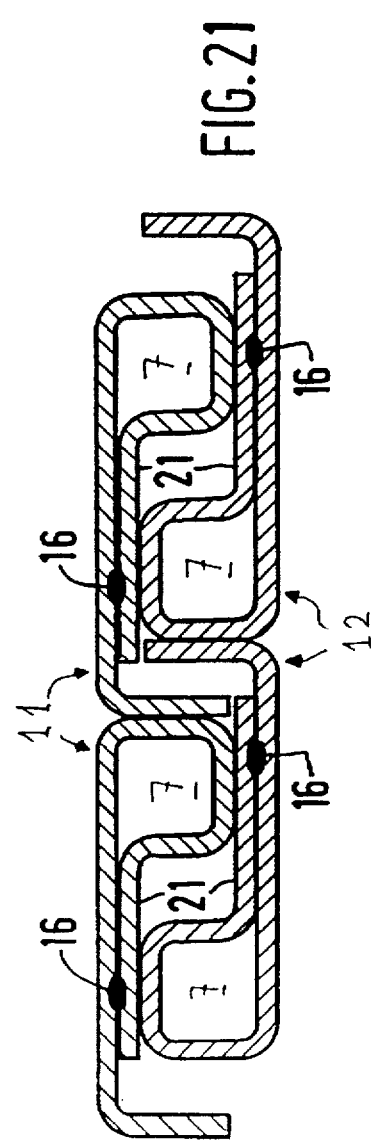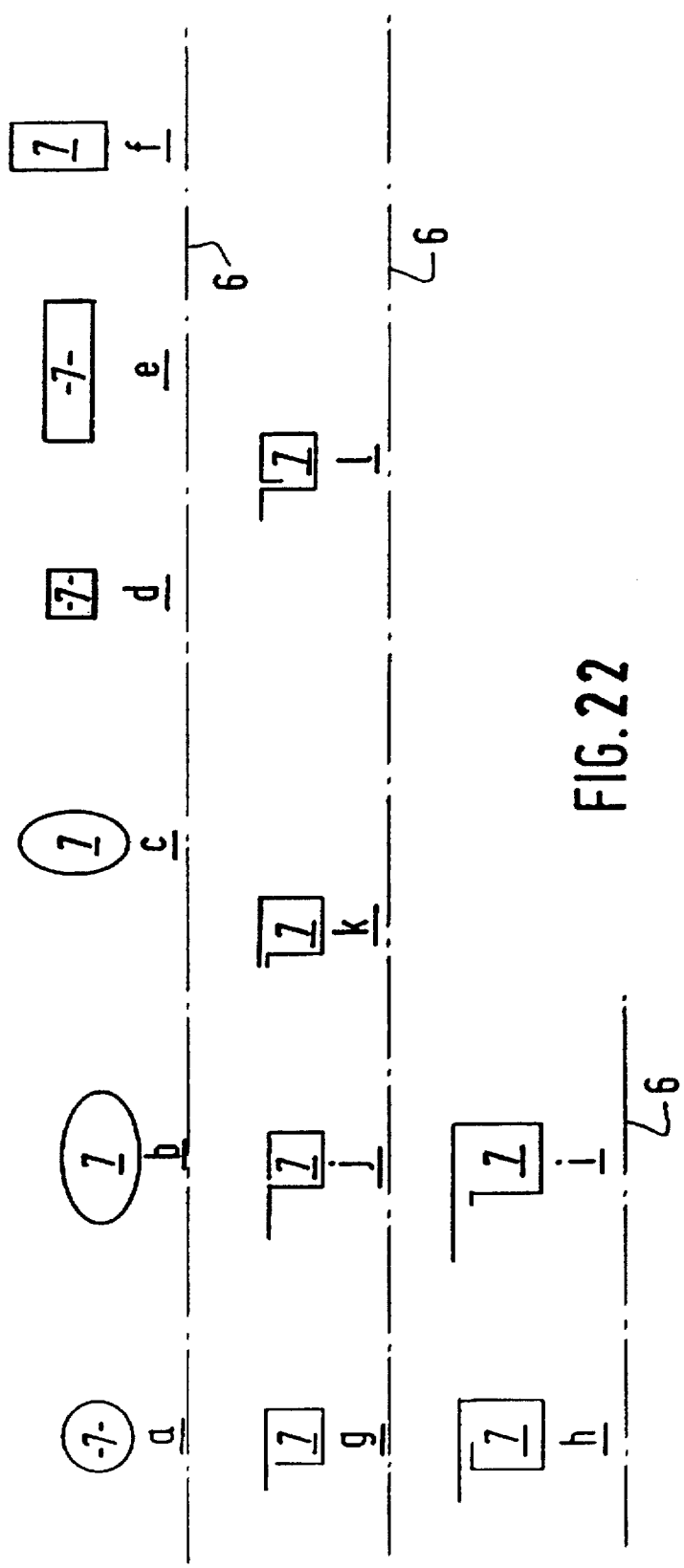

CASING AND FLEXIBLE TUBULAR CONDUIT COMPRISING SUCH A CASING AND PROCESS FOR PRODUCING IT

This application is a continuation of application Ser. No. 08/300,526 filed on Sep. 6, 1994, which is continuation of application Ser. No. 07/842,162, filed Apr. 13, 1992 all abandoned.

This invention relates mainly to a flexible metallic tube comprising hollow channels and a flexible tubular conduit comprising at least one such flexible metallic tube and process for making it.

Coflexip, one of the applicant companies, has for many years produced and marketed flexible tubular conduits of great lengths, with high mechanical strength, that can be used particularly for transporting hydrocarbons, in particular as part of an offshore oil production installation.

Current embodiments of "rough bore" type conduits comprise a double-interlocking, shaped metal strip constituting an inner tube that is resistant to crushing, an inner fluidtight sleeve, an armoring intended to give the flexible tubular conduit a considerable resistance to internal pressure and to axial pulling and a protective outside sleeve. These flexible tubular conduits can further be completed by one or more intermediate sleeves.

On the other hand, flexible tubular conduits called "smooth bore" are known whose inner wall consists of a fluidtight inside tube.

A particularly effective double-interlocking, shaped metal strip of known type is particularly described in French patent application No. 89/15272 filed on Nov. 21, 1989 by Coflexip, one of the applicant companies, published under the No. 2,654,795.

A plastic deformation of a flat metal strip such as a stainless steel band, to impart to it the shape of a double-interlocking shaped strip is performed. To form the tube, the spiral winding of the shaped strip is performed, i.e., its helical winding with slight pitch with interlocking of the shaped metal strips. After interlocking of two successive turns, a final plastic deformation of the strip is performed that is necessary to complete the interlocking.

According to this invention, a flexible metallic tube comprising at least one hollow channel is produced. By hollow compartment is meant an elongated closed volume of approximately constant section spirally wound around the axis of the tube.

The section of the hollow channel is, preferably, closed, the section of the hollow channel then being continuous. In a particular embodiment, the section of the hollow channel is closed by approximately contiguous joining of two elements constituting the wall of the hollow channel.

In a particular embodiment, the section of the hollow channel is closed by approximately contiguous joining of two elements constituting the wall of the hollow channel. As a variant, the section can be completely closed, the section of the hollow channel then being continuous.

The tube according to this invention comprises at least one metal shaped strip spirally wound with a slight pitch around the axis of the flexible conduit formed by the tube, the two lateral parts of the shaped strip constituting radial bearing surfaces which provide the axial interlocking of the shaped strip, at least one of these two radial bearing surfaces exhibiting the shape of a hollow channel, and the shaped strip further comprising at least one straight middle part forming a radial support bearing surface and corresponding to a cylindrical part of the tube.

The hollow channel of the tube according to this invention comprises, in planes that are approximately perpendicular to the longitudinal axis of the flexible conduit, a first radial face arranged on the side of the central part of the shaped strip, and a second radial face which constitutes one of the two lateral edges of the shaped strip. The hollow channel comprises, in a complementary way, two approximately cylindrical faces, one inner and the other outer, arranged so that they make it possible for the hollow channel to participate effectively in the resistance of the flexible conduit to radial forces, particularly to crushing forces.

The axial interlocking achieved by the radial bearing surfaces of the shaped strip makes it possible to limit, in a determined and precise way, the amplitude of the displacements that can, in the axial direction of the flexible conduit, affect the turns formed by the shaped strip. The shaped strip thus exhibits the shape of a helix whose pitch can vary between fixed limits of minimum pitch and maximum pitch.

On the other hand, in contrast with double-interlocking, shaped strips of known type, the tube according to this invention does not exhibit interlocking in the radial direction. It has been found that keeping the shaped strip in its general configuration, without disorganization of the structure, is provided satisfactorily, in particular thanks to the fitting of each hollow channel into the complementary elements of the shaped strip.

In a variant embodiment, the tube according to this invention comprises a first layer consisting of at least one shaped strip according to this invention, with at least one hollow channel whose two longitudinal edges forming an axial interlocking bearing surface are oriented radially in the same direction in relation to the flexible tubular conduit. The tube then further comprises a second layer consisting of at least one complementary shaped strip making it possible, in particular, to provide the axial interlocking of the tube. Said complementary shaped strip, can be either a shaped strip according to this invention, comprising at least one hollow channel, or any other shaped strip whose two lateral parts constitute axial interlocking radial bearing surfaces, said strip being able to exhibit in section, for example, a U shape.

In another variant embodiment, the tube according to this invention comprises a single layer which consists of at least one shaped strip whose two lateral parts forming an axial interlocking bearing surface are oriented radially, in opposite directions in relation to the axis of the flexible tubular conduit, so that said shaped strip exhibits a general S-shaped configuration.

In a view in cross section, the (S-shaped) shaped strip thus exhibits a radial central section, preferably perpendicular to the longitudinal axis of the tube, joining two middle parts which correspond respectively to an inner cylindrical bearing surface and to an outer cylindrical bearing surface for radial support.

In the case of this variant, the single layer constituting the tube according to this invention can, in particular, be made by spiral winding of a single shaped strip in the shape of an S exhibiting at least one hollow channel. Each of the two axial interlocking radial bearing surfaces of a turn is thus interlocked with the corresponding radial bearing surfaces of each of the two adjacent turns. In a variant, the layer can comprise two shaped strips in the shape of an S, exhibiting, preferably, identical sections, the axial interlocking of the turns of a strip being performed by the fitting of two interlocking radial bearing surfaces with the corresponding radial bearing surfaces of the turns of the other strip. It is also possible to make the layer constituting the tube by spiral winding of three, or even more than three, shaped strips in the shape of an S. In practice, the number of strips is limited, as a function of the ratio between the width of the strip and the winding diameter, so that the angle of the spiral produced by the wound strip is, in relation to the axis of the flexible conduit, sufficiently high, preferably greater than about 80°. Similarly, when the tube consists of two layers comprising complementary shaped strips, each of the layers can be made by spiral winding of two, or more than two, shaped strips, the various strips of the same layer exhibiting, preferably, identical sections, and the strips of at least one of the two layers exhibiting at least one hollow channel.

In a first embodiment, the two lateral parts forming an axial interlocking bearing surface exhibit a hollow channel shape.

In a second embodiment, one of the lateral parts exhibiting the shape of a hollow channel, the other lateral part of the shaped strip constitutes a hooking edge exhibiting, in a view in cross section of the shaped strip, the shape of a bent or straight section, this section being oblique or preferably perpendicular in relation to the longitudinal axis of the tube. In a recommended variant of this second embodiment, said hooking edge exhibits in a view in cross section of the shaped strip, the shape of a straight section resting perpendicularly on the opposite cylindrical bearing surface.

In an advantageous variant embodiment, the tube according to this invention comprises at least one shaped strip comprising at least one hollow channel of approximately rectangular section and at least one cylindrical central part constituting a radial support bearing surface.

In a particularly advantageous embodiment, the wall constituting the various parts of the shaped strip according to the invention exhibits an approximately constant thickness. The shaped strip is thus made from a metal strip of the "band" type, said strip being shaped to exhibit the desired shaped strip configuration with two axial interlocking radial bearing surfaces, at least one of the two longitudinal edges of the strip being folded so as to form a hollow channel of approximately closed section. The use of the hollow channels makes it possible to improve the mechanical resistance to internal and/or external pressure of the tube according to this invention. Furthermore, the presence of the hollow channels makes it possible to facilitate the production, particularly by bending of the metal strips, of the tube according to this invention in comparison with the known interlocked strip.

The shaped strip according to this invention can exhibit greatly varied dimensions. The thickness of the wall constituting the various parts of the shaped strip is defined, case by case, as a function of the diameter of the flexible conduit formed and of the desired mechanical strength; it can, as a function of the characteristics, be equal to between about 0.5 mm and 4 mm or even 5 mm. It is thus possible to produce flexible tubular conduits with a relatively slight inner diameter, 50 mm for example, or relatively large, up to about 500 mm. Compared with double-interlocking, shaped strips of known type, the use of the shaped strip according to this invention is particularly advantageous in the case of flexible conduits exhibiting a large diameter and/or a high resistance to crushing, the thickness of the wall being able to reach a high value, greater than the maximum thicknesses of the double-interlocking, shaped strips.

The invention has mainly as its object a tube according to any one of claims 1 to 11.

The invention also has as its object a flexible tubular conduit according to any one of claims 12 to 15.

The invention also has as its object a process for producing a tube according to any one of claims 16 to 18.

The invention also has as its object a flexible tubular conduit characterized by the fact that it comprises at least one tube according to this invention.

The invention will be better understood from the following description, and the accompanying figures, given as nonlimiting examples, of which:

FIG. 5 is a view in section of a first example of embodiment of a flexible metallic tube according to this invention;

FIG. 6 is a view in section of a second example of embodiment of flexible metallic tube according to this invention;

FIG. 21 is a view in section of a seventeenth example of embodiment of flexible metallic tube according to this invention;

FIG. 22 is a diagram illustrating twelve examples of shapes of hollow channels, able to be used, of the tube according to this invention;

In FIGS. 1 to 27, the same references have been used to designate the same elements.

Figure 1:
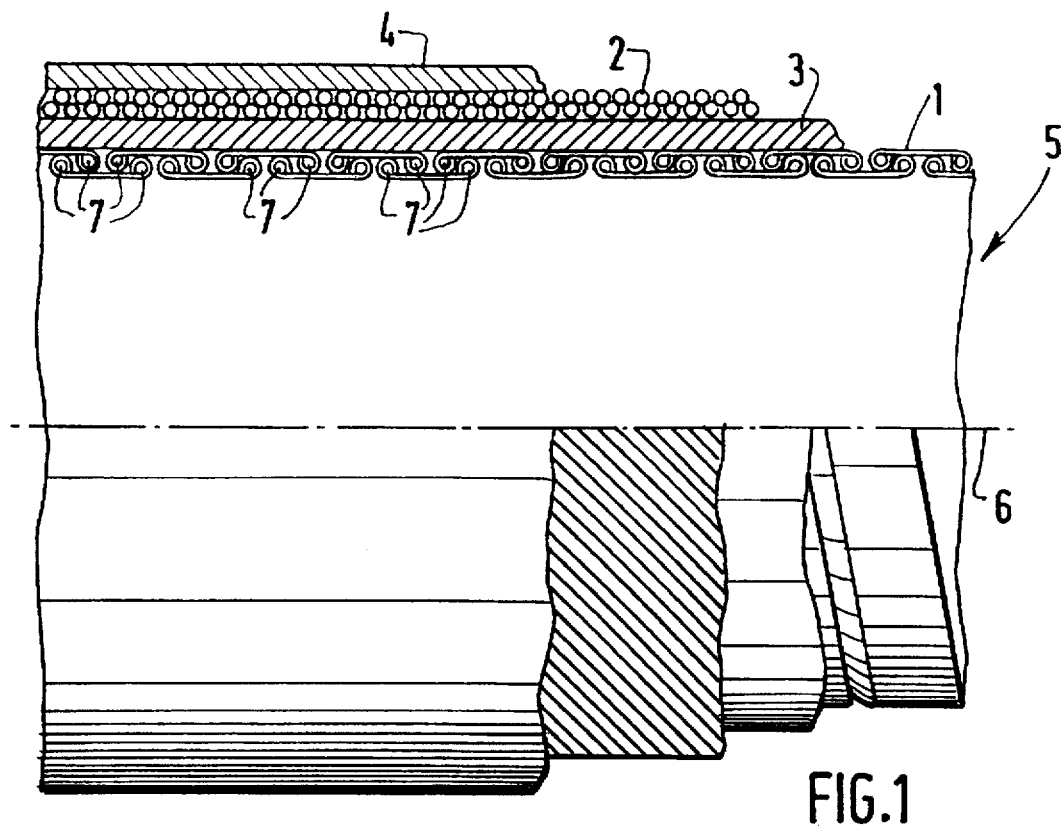
FIG. 1 is a partially exploded diagrammatic view in longitudinal section of a first embodiment of flexible tubular conduit according to this invention.

In FIG. 1, a "rough bore" type flexible tubular conduit can be seen that comprises a flexible metallic tube 1 comprising hollow channels 7. The tube illustrated in FIG. 1 consists, for example, of two complementary shaped strips spirally wound with a slight pitch, so as to form two layers of turns so that the turns of one layer are axially interlocked by interlocking with the turns of the other layer.

Examples of sections of tubes according to this invention are described in FIGS. 5 to 25.

Flexible tubular conduits 5, with axis 6 comprise, in addition to flexible metallic tube 1, an armoring 2 for resistance to pulling and to inside pressure, consisting preferably of one or more pairs of crossed layers of armoring wires of metal or of composite materials resistant to pulling. Finally, the flexible tubular conduit comprises an inner sealing sleeve 3 placed between tube 1 and armoring 2 as well as an outer sleeve 4.

Figure 2:
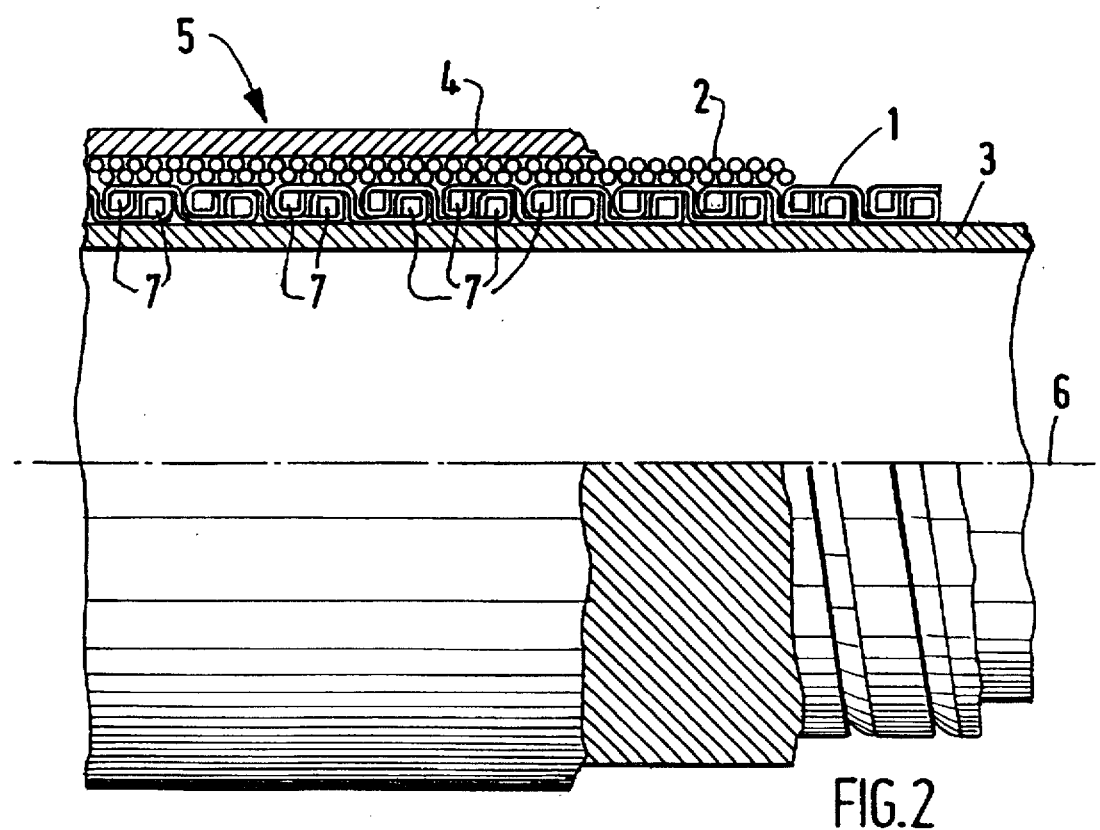
FIG. 2 is a similar view of a second embodiment of flexible tubular conduit according to this invention.

In FIG. 2, a "smooth bore" type flexible tubular conduit can be seen whose fluidtightness is provided by an inner tube 3 resting on a flexible metallic tube 1 consisting, for example, of a shaped strip according to this invention, the shaped strip having a general S-shaped configuration and thus forming a simple layer of turns that are mutually interlocked in the axial direction.

The tube of flexible tubular conduit 5 of the figure provides, on the one hand, the resistance to crushing and, on the other hand, the resistance to the circumferential component induced by the internal pressure.

The resistance to crushing facilitates the production and handling of the flexible tubular conduit, and makes it possible to withstand the hydrostatic pressure, the conduit being laid at the bottom of the sea, when the pressure on the inside of the conduit is less than the hydrostatic pressure, or, for example, equal to the atmospheric pressure. Furthermore, in the case of "rough bore" type flexible tubular conduits illustrated in FIG. 1, tube 1 constitutes a resistant support for sleeve 3 and thus makes it possible to withstand the pressure of a gas that is between sleeves 3 and 4, and that comes from the gradual diffusion through sealing sleeve 3 of a gaseous phase present in the fluid under pressure transported by flexible conduit 5. Tube 1 thus makes it possible, in case of depressurization of the flexible conduit, to prevent the deformation or crushing of sleeve 3 under the action of the pressure created by the diffusion of the gas.

Figure 3:
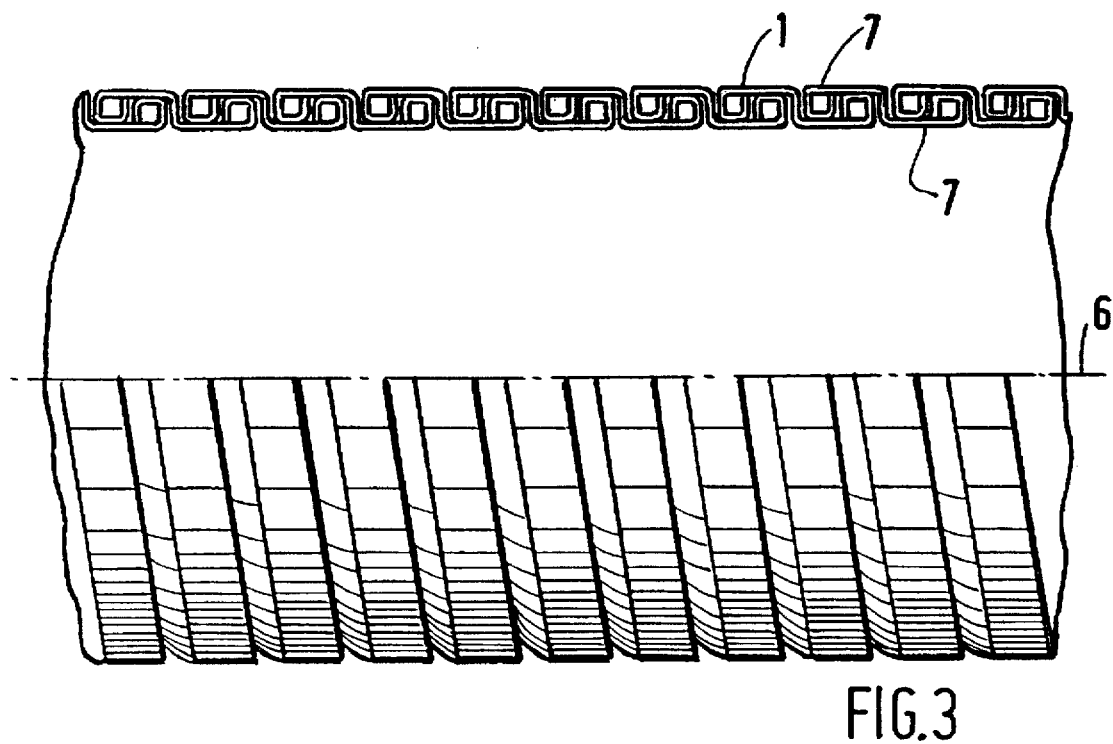
FIG. 3 is a similar view of a third embodiment of flexible tubular conduit according to this invention.

Tube 1 according to this invention can, by itself alone, constitute a flexible tubular conduit. This case is illustrated in FIG. 3. The example illustrated in FIG. 3 comprises at least one S-shaped strip comprising a hollow channel 7 on each of these main edges. Of course, the use of other shapes comprising hollow channels 7 does not go outside the scope of this invention.

Figure 4:
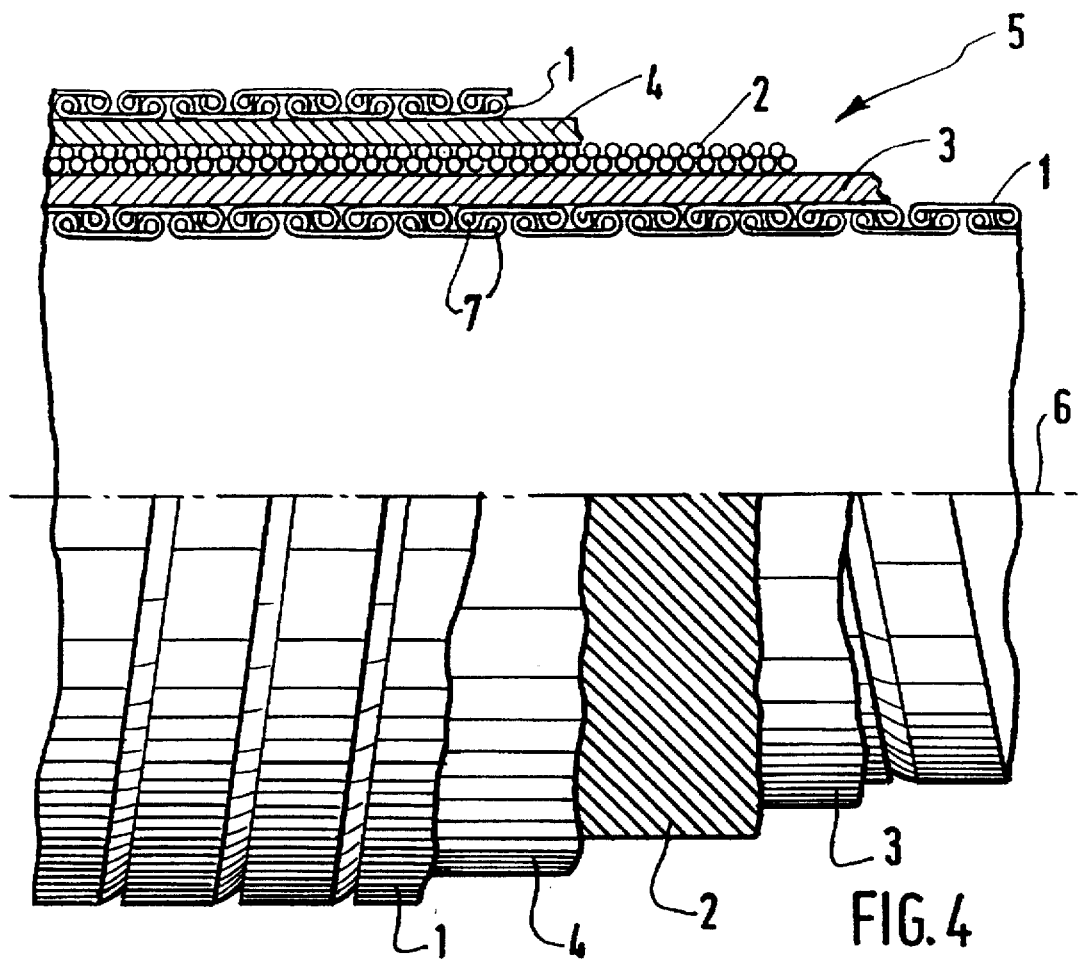
FIG. 4 is a similar view of a fourth embodiment of flexible tubular conduit according to this invention.

Also, as illustrated in FIG. 4, tube 1 according to this invention can form a protective outer layer of a flexible tubular conduit 5. Outside tube 1 covers (as illustrated in FIG. 4) or replaces outer sleeve 4 of FIGS. 1 and 2. Such a metal armor improves the protection from impacts and abrasion. Such protection can be necessary to protect the flexible tubular conduit during handling, for example on a drilling worksite, and from abrasion, for example by displacement with friction over coral reefs or a rocky sea floor. Flexible conduit 5 illustrated in FIG. 4 also comprises another tube 1 according to this invention constituting the inner tube of the flexible conduit of the "rough bore" type.

FIGS. 5 to 24 illustrate various examples of embodiment of tube 1 according to this invention.

FIGS. 5 to 21 exhibit various examples of casing 1 comprising shaped strips whose wall exhibits a constant thickness and which consist of a metal strip shaped so as to exhibit the general configuration of a shaped strip according to this invention with 2 axial interlocking radial bearing surfaces at least one of which is a hollow channel 7.

In FIG. 5, a first example of embodiment of tubes 1 according to this invention can be seen that uses a first strip 11 and a second strip 12 of complementary shapes which constitute, respectively, a first layer and a second layer of tube 1. Each shaped strip 11 and 12 exhibit two radial bearing surfaces oriented in the same direction on each side of the cylindrical central part of the strip. The radial bearing surfaces of the two strips face each other, which makes it possible to provide the axial interlocking of the turns and their relative positioning in the length of the flexible conduit formed. In the case of the example illustrated in FIG. 5, the two radial bearing surfaces of each strip are hollow channels 7. It is said that each of strips 11 and 12 exhibits a constant thickness and which consist of a metal strip shaped so as to exhibit the general configuration of a shaped strip according to this invention with two axial interlocking radial bearing surfaces at least one of which is a hollow channel 7.

FIGS. 5 to 12 illustrate a first variant embodiment of shaped strips according to the invention consisting of a metal strip, or band, according to which the end of at least one of the two lateral parts of the band is folded so as to take the shape of a straight edge that is inscribed in a plane approximately perpendicular to axis 6 of the flexible conduit and so as to constitute a first radial face of a hollow channel 7, this first radial face being, in relation to the hollow channel, located on the side of the middle part of the shaped strip. According to this variant, the end of the lateral part of the band constituting the first radial face of the hollow channel rests perpendicularly, by its edge, on the cylindrical zone of the shaped strip which is opposite it, so as to form an approximately closed hollow channel 7. Because of the rigidity of the band that constitutes the walls of the shaped strip, this configuration makes it possible to prevent deformations of the shaped strip, in particular in the radial direction, which makes it possible to increase the resistance of tube 1 to crushing.

Figure 7:
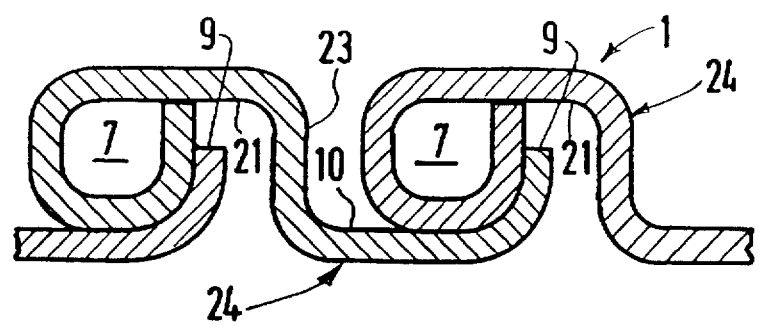
FIG. 7 is a view in section of a third example of embodiment of flexible metallic tube according to this invention.

In FIG. 7, a first example of embodiment of casings 1 according to this invention can be seen that uses a first strip 11 and a second strip 12 of complementary shapes which constitute, respectively, a first layer and a second layer of tube 1. Each shaped strip 11 and 12 exhibits two radial bearing surfaces oriented in the same direction on each side of the cylindrical central part of the strip. The radial bearing surfaces of the two strips face each other, which makes it possible to provide the axial interlocking of the turns and their relative positioning in the length of the flexible conduit formed. In the case of the example illustrated by FIG. 5, the two radial bearing surfaces of each strip are hollow channels 7.

It is said that each of strips 11 and 12 has the shape of glasses to the extent that they exhibit, seen in cross section, at each of their ends, a hollow channel 7 connected by a cylindrical middle bearing surface. Each hollow channel 7 comprises a cylindrical face which constitutes the extension of the cylindrical middle bearing surface, so that strips 11 and 12 each exhibit a continuous cylindrical outside surface 5 that serves as a radial support bearing surface. The inside and outside surfaces of tube 1 can thus exhibit an approximately continuous cylindrical shape, the discontinuities being limited to the spaces separating two contiguous turns, which makes it possible to provide a good support for plastic sleeves and armoring layers in contact with tube 1, and to perform the transmission of radial forces under excellent conditions. Between hollow channels 7 of each strip 11 or 12 is provided a sufficient U-shaped space forming a trough 21 to allow two hollow channels 7 belonging to two turns of complementary strip 12 or 11, respectively, to enter. In the example illustrated in FIG. 5, hollow channels 7 of each of strips 11 and 12 are formed by folding inward and support perpendicular to the cylindrical middle bearing surface (bottom of U 21) of the strip. Hollow channels advantageously have an approximately rectangular section with rounded corners. Each hollow channel rests by an approximately flat surface on the cylindrical middle bearing surface of the complementary strip. This arrangement makes it possible to optimize the crushing strength of tube 1 for a given thickness of sheet metal.

The mechanical strength of tube 1, in particular its crushing strength, can be evaluated by testing, or by calculation. For this purpose, the applicant companies have developed calculation methods that are particularly applicable to the flexible tubular structures consisting of the spiral winding with slight pitch of a shaped strip or a compact wire of any shape. These methods, which are based on general laws of mechanics, make it possible to introduce certain specific factors which have been determined, in correlation with the results of tests which were performed on a large number of samples of tubes of various sizes and configurations.

The characteristics of an Example 1 of tube 1 of the same type as the one illustrated by FIG. 5, with two complementary strips 11 and 12 each comprising two hollow channels 7 whose closing edges are contiguous, is described below.

thickness of the wall (i.e., thickness of the band constituting the shaped strip)
c=2.1 mm total thickness of the tube in the radial direction relative to the tubular conduit formed (i.e., total height seen in cross section of the two strips 11 and 12)
h=20.1 mm total width of each of the shaped strips 11 and 12
l=81 mm total width of the metal strip, or band, constituting each of strips 11 and 12 (i.e., developed length of the profile delineated by the shaped strip seen in cross section)
L=155 mm inside diameter of the flexible tubular conduit consisting of tube 1
D=304.8 mm (12 inches)

Tube 1 thus exhibiting a weight of 64 kg for a flexible tubular conduit length of 1 meter, it has been found that the crushing strength reaches 130 bars if the material used is an austenitic stainless steel consistent with standard AISI 316.

The maximum pressure thus determined corresponds to the case of crushing by effect of hydrostatic pressure, i.e., with the flexible conduit subjected to a uniform outside pressure.

Consequently, tube 1 according to Example 1 can be used in water depths that can vary between about 650 m and 850 m, as a function, particularly, of the safety factors adopted and the codes of calculations applicable to the terms of the regulations.

By comparison, a tube consisting of a double-interlocking, shaped strip according to the prior art, made with the same material and exhibiting the same inside diameter, reaches a weight of 76.7 kg/m to offer the same crushing strength equal to 130 bars.

In this case, tube 1 according to this invention makes it possible therefore to achieve a reduction in weight equal to 16.5% by comparison with the equivalent tube according to the prior art. In addition to the resulting savings with regard to production costs, this weight reduction exhibits an extreme advantage in the case of conduits that must be laid in great depths of water, exceeding for example 500 m, and that can reach or exceed 1000 m or even 1500 m, as a function, in particular, of the diameter of the flexible conduit.

The crushing strength of the tube can be increased, in particular, by increasing thickness e of the wall.

Thus, in the case of an Example 2 of a tube exhibiting a configuration similar to Example 1, with an inside diameter of the tubular conduit formed equal to 292 mm, thickness e has been brought to 3 mm, total thickness h of the tube reaching 23mm. A crushing strength of 166 bars for a unit weight of 88.9 kg/m is then obtained.

The variant tube according to this invention illustrated in FIGS. 5, 9, 10, 11, 12, 16, 17, 19, 20 and 21 comprises two layers each consisting of a shaped strip, the two edges of each layer forming axial interlocking bearing surfaces and being oriented in the same direction relative to axis 6 of the flexible tubular conduit. The axial interlocking bearing surfaces of each of the two layers are oriented in the direction of the other layer so as to form, head to tail, a U-shaped profile.

In FIG. 6, a tube 1 can be seen consisting of a shaped strip 24 in the shape of an S comprising hollow channels 7 in two lateral parts, each hollow channel entering a trough 21 formed between hollow channels 7 of the contiguous turn and cross bar 23 of the S. The spiral winding of tube 1 can be performed by using a single strip, or a plurality of strips of S-shaped bands 24, wound parallel to one another, to form a single layer of identical interlocked turns.

Thus, it has been possible to define the characteristics, summarized below, of an Example 3 of tube 1 consisting of a shaped strip 24 in the shape of an S comprising two hollow channels 7 exhibiting contiguous closing edges, as illustrated by FIG. 6:

| | |
|---|---|
| thickness of the wall | e = 2.9 mm |
| total thickness of the tube | h = 20.9 mm |
| width of the shaped strip | l = 84 mm |
| total width of the band | L = 192 mm |
| inner diameter | D = 304.8 mm |

This tube has a weight of 83.7 kg/m and offers a crushing strength of 130 bars when it is made of AISI 316 stainless steel.

In FIG. 7, a tube 1 can be seen that comprises metal strips 24 comprising a hollow channel 7 in its first lateral part and a hooking edge 9 formed by the lateral edge affixed to hollow channel 7 and constituting the second axial interlocking radial bearing surface. Each strip is approximately in the shape of an S. Edge 9 enters trough 21 formed by hollow channel 7 and hooking bar 9 and cross bar 23 of the following turn.

Figure 8:
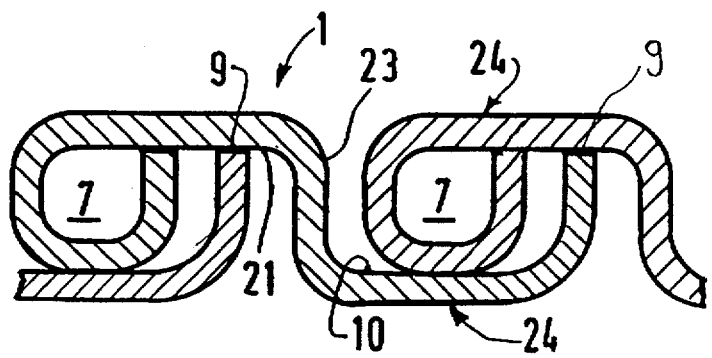
FIG. 8 is a view in section of a fourth example of embodiment of flexible metallic tube according to this invention.

On the other hand, in the case illustrated in FIG. 8, the end of edge 9 rests at the bottom of troughs 21 and thus participates in the rigidity of tube 1. The variant of FIG. 8 therefore exhibits a greater rigidity than that of the variant of FIG. 7.

Figure 9:
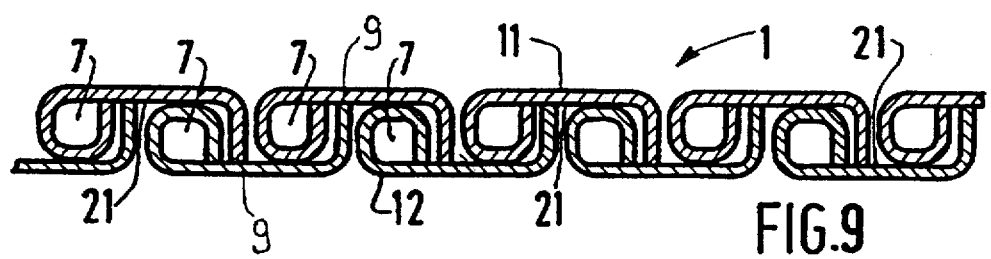
FIG. 9 is a view in section of a fifth example of embodiment of flexible metallic tube according to this invention.

In FIG. 9, an example of tube 1 according to this invention can be seen that comprises two complementary shaped strips 11 and 12, the tube consisting of two layers. Each of the strips comprises a hollow channel 7 at one of its ends and a hooking edge 9 at the other end. Each hollow channel 7 of a turn and each hooking edge 9 of the contiguous turn of the same strip 11 or 12 enters trough 21 formed between hooking edge 9 and hollow channel 7 of the same turn of the other strip 12 or 11.

Figure 10:
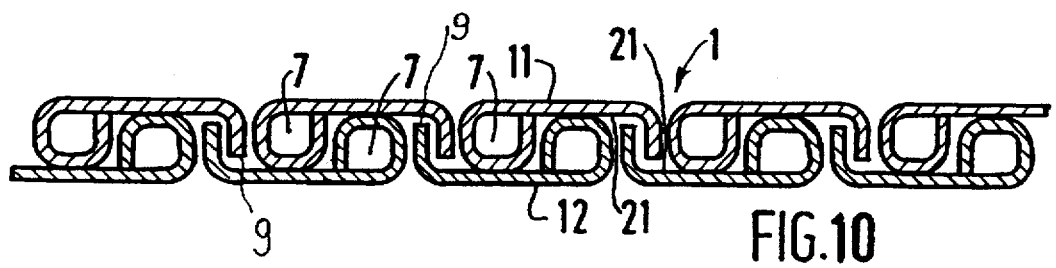
FIG. 10 is a view in section of a sixth example of embodiment of flexible metallic tube according to this invention.

In FIG. 10, an example of embodiment of tube 1 according to this invention can be seen in which, on the one hand, the direction in which respectively hollow channel 7 and hooking edge 9 of the same turn of one of strips 12 are arranged relative to the other strip is reversed compared with the example of FIG. 9, and where, on the other hand, hooking edge 9 of each strip 11 (or 12) does not touch trough 21 of the other strip 12 (or 11).

Figure 11:
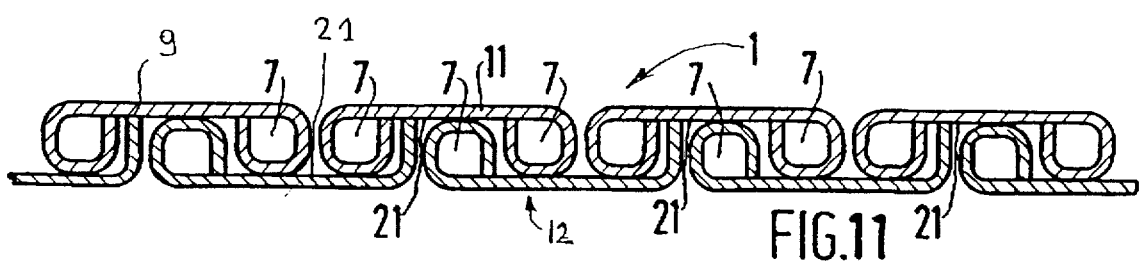
FIG. 11 is a view in section of a seventh example of embodiment of flexible metallic tube according to this invention.

In FIG. 11, an example of embodiment of tube 1 according to this invention can be seen that uses two complementary strips 11 and 12 exhibiting a central trough 21. Strip 11, in the shape of glasses, comprises a hollow channel 7 at each of its main ends. Strip 12 comprises hollow channels 7 at one end and a hooking edge 9 at the opposite end. A radial edge of strip 12 forming the preceding turn and a hollow channel 7 of strip 12 forming the following turn enter each trough 21 of strip 11. Two hollow channels 7 belonging to two contiguous turns of strip 11 enter each trough 21 of strip 12.

Figure 12:
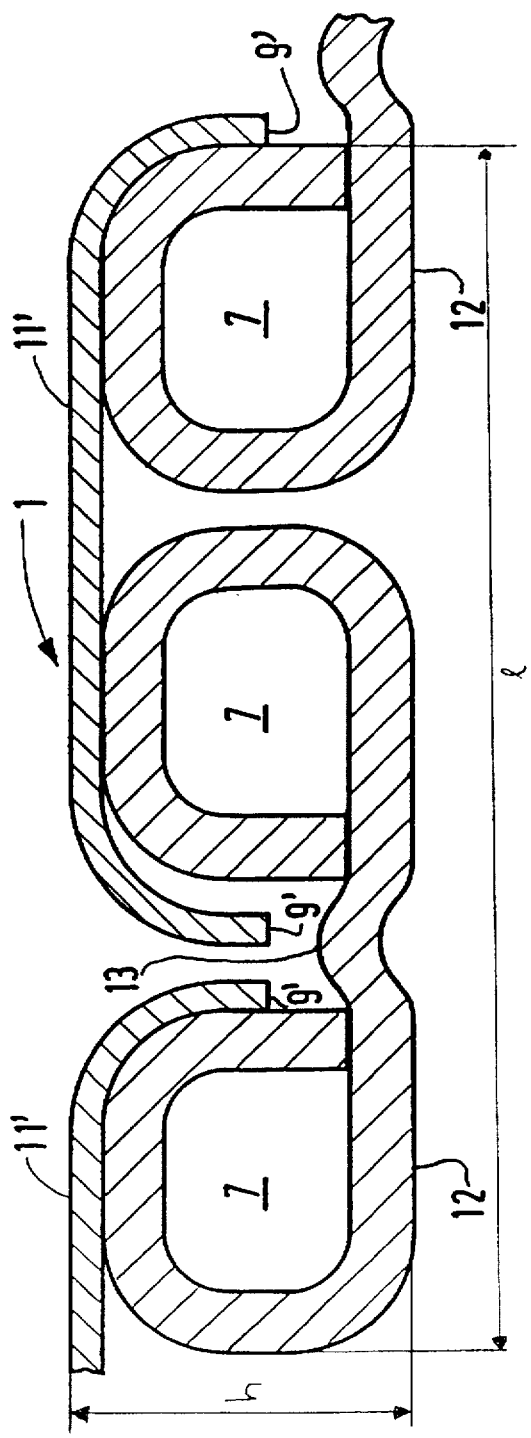
FIG. 12 is a view in section of an eighth example of embodiment of flexible metallic tube according to this invention.

In FIG. 12, a particularly advantageous variant of the tube according to this invention can be seen. Tube 1 comprises, on the one hand, a strip 12 in the shape of glasses comprising a hollow channel 7 at each of its main ends and constituting a first layer, and, on the other hand, a second layer comprising a complementary strip 11' whose two lateral edges constitute radial bearing surfaces making it possible to provide the axial interlocking of tube 1 in cooperation with hollow channels 7 of strip 12.

Figure 23:
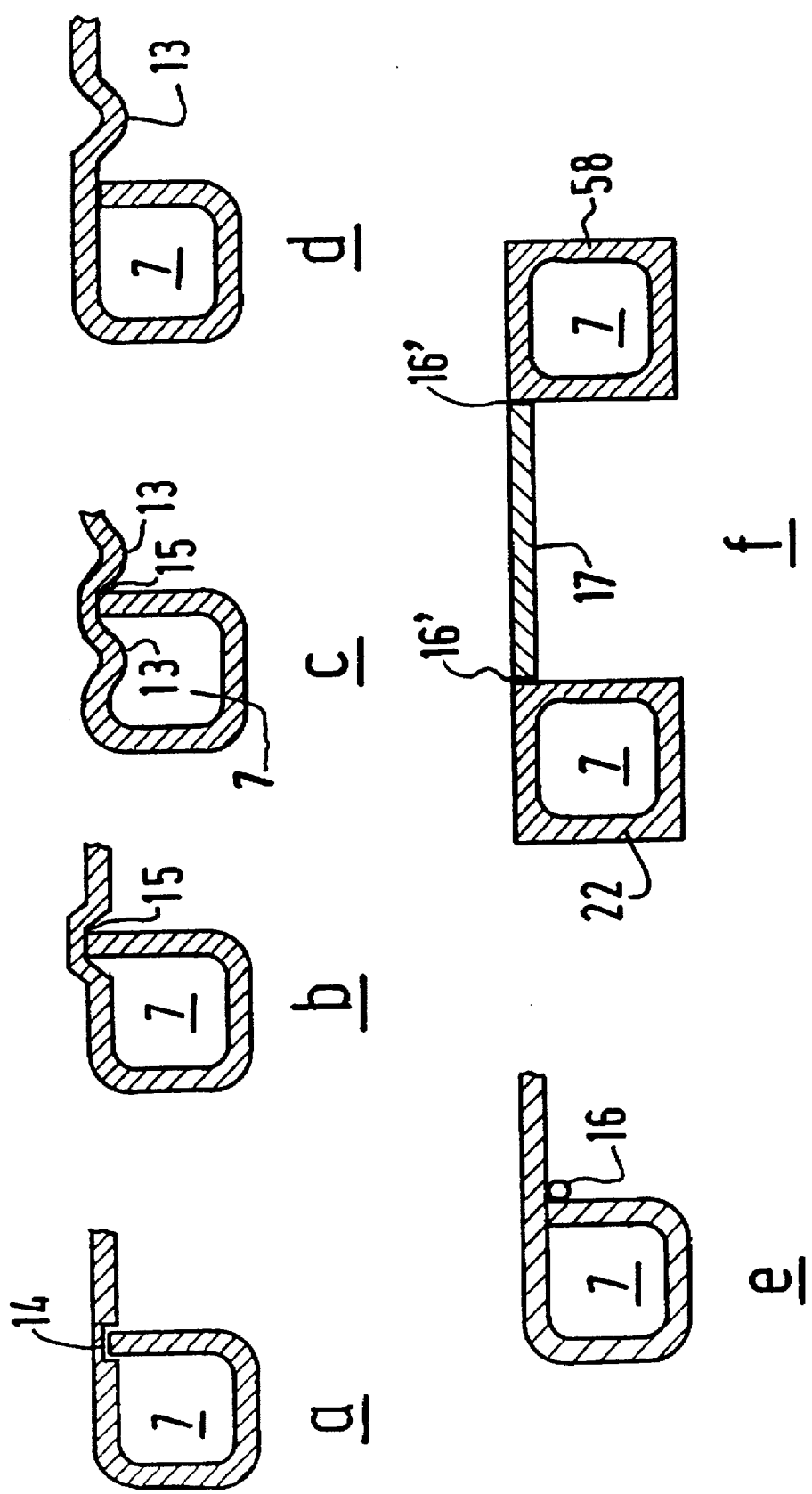
FIG. 23 is a diagrammatic view of a means preventing the deformation of the hollow channels that can be used in the tube according to this invention.

Advantageously, strip 12 comprises means 13 that prevent warpings or displacements of its ends. In the example illustrated in FIG. 12, means 13 consist of a bulge separating hollow channel 7 and preventing them from opening. Other means intended to prevent the danger of warping or of opening that is already extremely slight are illustrated in FIG. 23.

The axial play between strips 12 is limited by strips 11' in the shape of a U forming a circlip. Ends 9' of the two adjacent strips 11' can enter troughs formed between hollow channels 7 of strips 12.

Of course, the extension of radial ends 9' of the legs of the U so as to have them rest on the main bearing surface of strips 12 does not go outside the scope of this invention.

Strips 11' exhibit a good support surface to serve as a seating for sealing sleeve 3. Thus, in the case of "rough bore" type flexible tubular conduits, illustrated in FIGS. 1 and 4, strips 11' are placed outward. In the case of "smooth bore" conduits illustrated in FIG. 2, the opposite occurs: strips 11 being directed toward the outer surface of inner sealing tube 3, and strips 12 being on the outside side of tube 1.

In another variant, not illustrated, of the same embodiment in which the tube comprises a first layer consisting of a shaped strip whose two axial interlocking bearing surfaces are oriented in the same direction relative to the axis of the flexible tubular conduit, the axial interlocking being provided by a complementary strip exhibiting a U-shaped section, the shaped strip constituting the first layer comprises at one end a hollow channel and at the other end a hooking edge.

FIGS. 13 to 21 illustrate another variant embodiment of a tube comprising a shaped strip exhibiting a wall of approximately constant thickness and consisting of a shaped band, a variant according to which at least one of the two lateral parts of the band is formed so as to constitute a hollow channel 7, the end of the edge of the band being folded and resting tangentially on the cylindrical zone forming a radial support bearing surface of the tube which is facing it, so that hollow channel 7 exhibits an approximately closed section.

Figure 13:
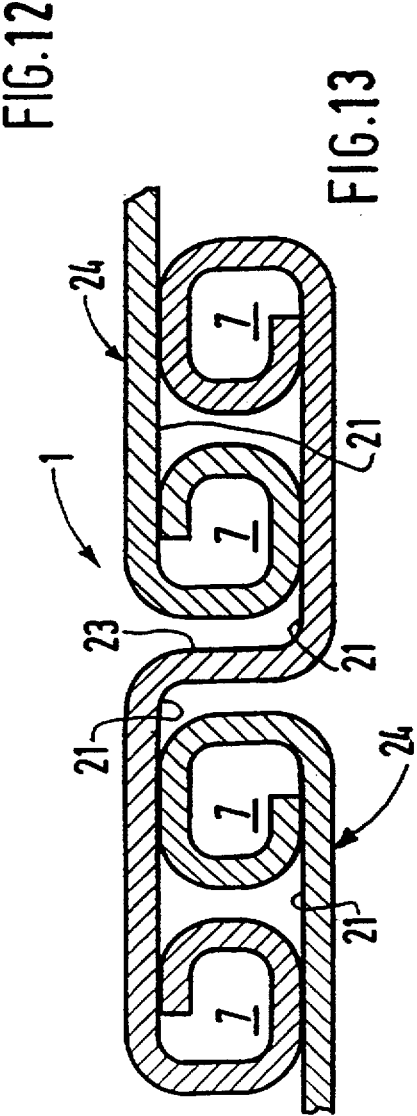
FIG. 13 is a view in section of a ninth example of embodiment of flexible metallic tube according to this invention.

In a variant embodiment illustrated by FIG. 13, the end of the edge of the band rests tangentially toward the inside of hollow channel 7 on the cylindrical radial support bearing surface which constitutes one of the two cylindrical faces of hollow channel 7.

In FIG. 13, a variant embodiment of tube 12 according to this invention can be seen, comprising at least one strip 24 in the shape of an S. In the example illustrated in FIG. 13, the free edge of hollow channels 7 which constitute the lateral end of the band is folded and its end rests on the lateral part of trough 21 of the shaped strip which constitutes a first cylindrical face of hollow channel 7, the hollow channel resting by a cylindrical face opposite said first face in trough 21 of the adjacent turn.

The same configuration of tangential support toward the inside of hollow channel 7 of the edge of the shaped strip providing the closing of the section of the hollow channel is also possible in the case (not shown) of a shaped strip in the shape of an S with a single hollow channel 7, the second edge of the strip being produced in the form of hooking edge 9 (as illustrated in FIGS. 7 or 8), or further, for example, in the case (also not shown) of a shaped strip whose two lateral parts forming an axial interlocking radial bearing surface are oriented radially in the same direction, at least one of the two radial bearing surfaces exhibiting a hollow channel shape 7 with the free edge of the hollow channel folded inward.

In FIGS. 14 to 21, the end of the edge of the band rests tangentially outside hollow channels 7.

Figure 14:
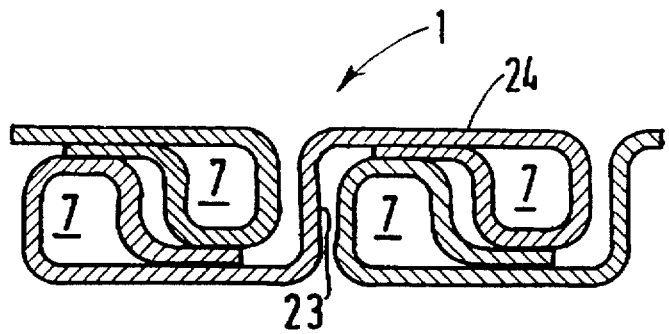
FIG. 14 is a view in section of a tenth example of embodiment of flexible metallic tube according to this invention.
Figure 15:
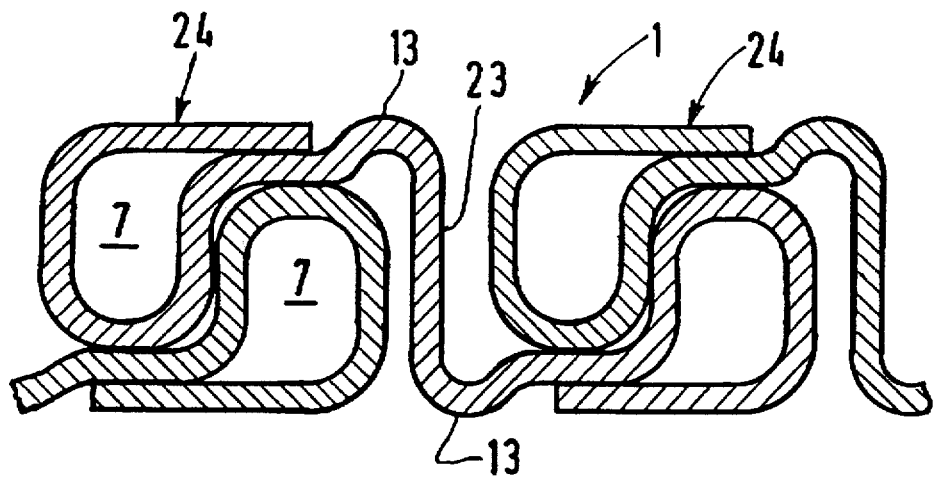
FIG. 15 is a view in section of an eleventh example of embodiment of flexible metallic tube according to this invention.

In FIGS. 14 and 15, a tube can be seen that comprises a strip 24 in the shape of an S. The example illustrated in FIG. 15 comprises, in addition, bulges 13 making it possible to secure the position of the end of the edge of the band constituting the free edge of the hollow channel and thus preventing the deformation of the hollow channel.

Figure 16:
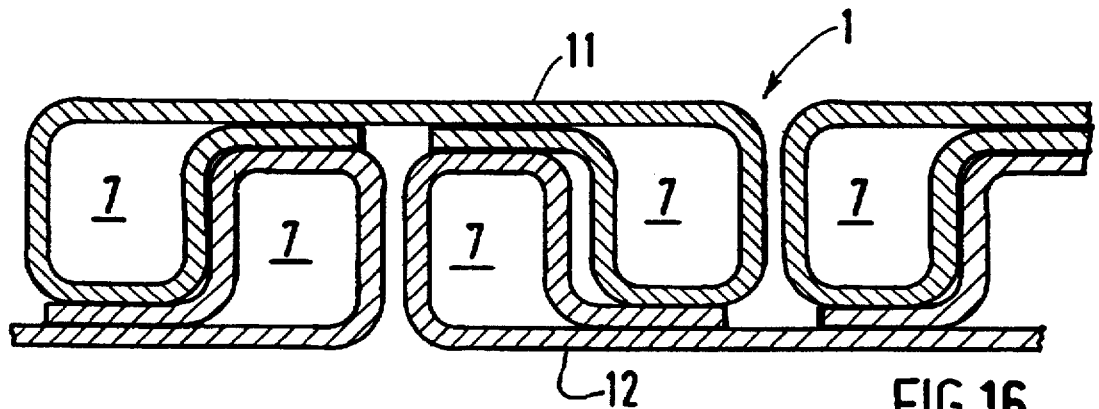
FIG. 16 is a view in section of a twelfth example of embodiment of flexible metallic tube according to this invention.
Figure 17:
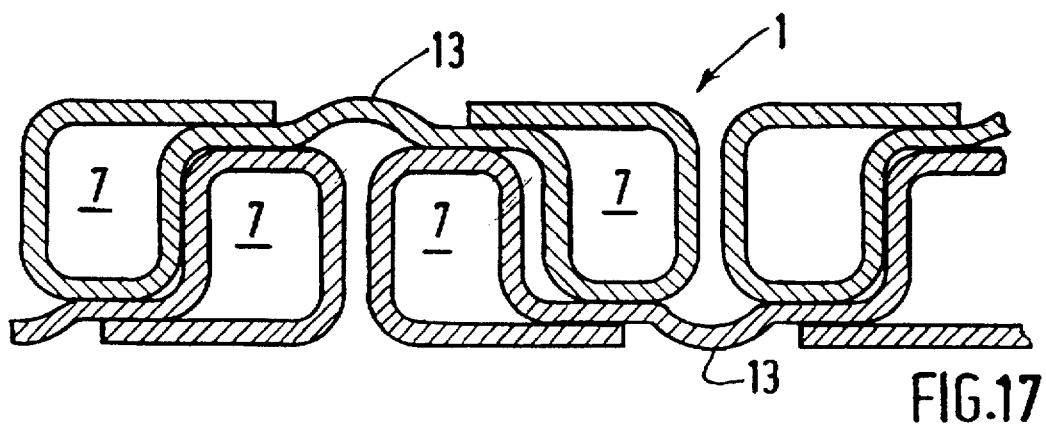
FIG. 17 is a view in section of a thirteenth example of embodiment of flexible metallic tube according to this invention.

In FIGS. 16 and 17, a tube 1 can be seen that is formed by two strips 11 and 12 in the shape of glasses. The example illustrated in FIG. 17 comprises a bulge 13 preventing the deformation of hollow channel 7 in the same way as bulge 13 of FIG. 15.

Figure 18:
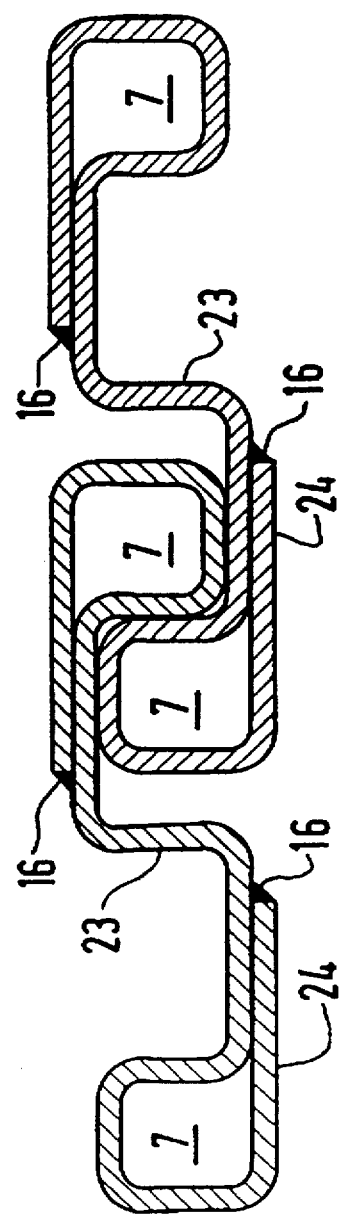
FIG. 18 is a view in section of a fourteenth example of embodiment of flexible metallic tube according to this invention.
Figure 19:
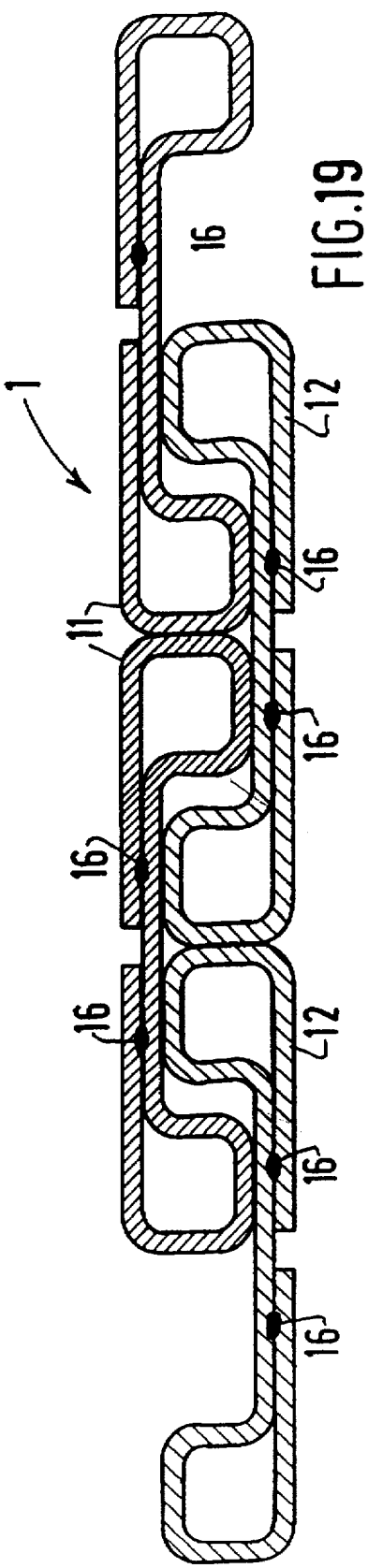
FIG. 19 is a view in section of a fifteenth example of embodiment of flexible metallic tube according to this invention.

FIG. 18 illustrates a tube consisting of the winding of a shaped strip 24 exhibiting an S shape with a configuration similar to the one illustrated by FIG. 15, but without bulge 13, the securing of the free edge of hollow channel 7 being provided by welding points or a welding bead 16. In the case of FIG. 19, each of the two middle cylindrical bearing surfaces separated by cross bar 23 is surrounded and consolidated on a large part of their length, by a complementary cylindrical bearing surface formed by the extension of the free edge of hollow channel 7, said complementary cylindrical bearing surface constituting a radial support bearing surface of the shaped strip.

FIG. 19 illustrates a tube comprising two strips 11 and 12 in the shape of glasses with a configuration similar to FIG.

17, but without bulge 13, the securing of the free edge of hollow channel 7 being provided at 16 by welding. In the example illustrated in FIGS. 19 and 21, welding 16 is performed between superposed sheet metal pieces.

Figure 20:
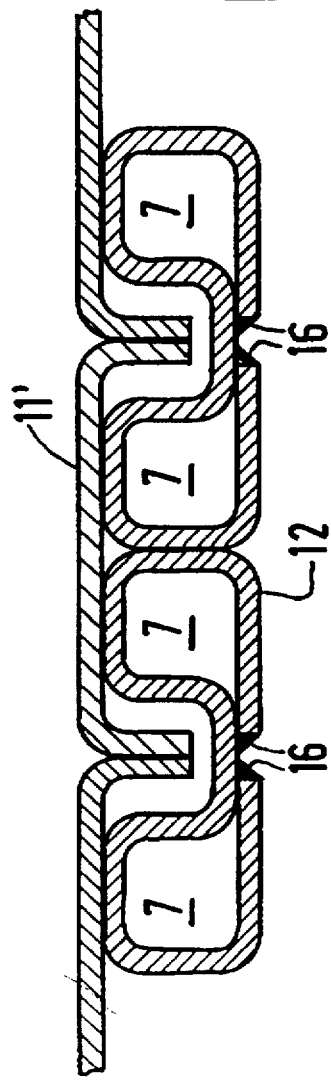
FIG. 20 is a view in section of a sixteenth example of embodiment of flexible metallic tube according to this invention.

In FIG. 20, a tube can be seen that comprises a first layer consisting of the winding of a shaped strip 12 in the shape of glasses, the axial interlocking being performed, as in the variant illustrated in FIG. 12, by a second layer consisting of the spiral winding of a complementary strip 11', in the shape of a U. The locking of the free edge of hollow channels 7 is provided at 16 by welding.

FIG. 21 illustrates a tube whose general organization is similar to the one in FIG. 10, in the sense that it is composed of two complementary strips 11 and 12, each strip comprising at one of its ends a hollow channel 7 and at the other end a hooking edge 9. But, in the case of FIG. 21, the end of the free edge of hollow channel 7 rests tangentially outside hollow channels 7 on the cylindrical bearing surface formed by the shaped strip, the position of the free edge being secured by welding 16.

In the example of FIG. 21, the extension of the free edge of hollow channel 7 of each strip 11, 12 constitutes a complementary cylindrical bearing surface resting on trough 21 and thus consolidating the middle cylindrical support bearing surface of strip 11, 12, and constituting on the other hand, a support surface for hollow channel 7 of the other strip 12, 11.

Of course, shaped strips exhibiting a section similar to the one of those illustrated by FIGS. 18 to 21, but not exhibiting welding points or welding bead 16, do not go outside the scope of the invention.

In FIG. 22, various nonlimiting examples of sections of hollow channels 7 can be seen that are able to be used in the device according to this invention.

The profile of FIG. 22a has a circular ring shape.

In FIG. 22b, the section of hollow channel 7 forms an elliptical ring whose major axis is parallel to axis 6 of the flexible tubular conduit.

On the other hand, in the case illustrated in FIG. 2c, the orientation of the major axis of the ellipse is perpendicular to axis 6. In an advantageous example of embodiment of the device according to this invention, hollow channels 7 are used that comprise radial walls or faces. The example illustrated in FIG. 22d corresponds to a hollow channel of square section.

The examples of FIGS. 22e and 22f comprise hollow channels 7 of rectangular section, the length is parallel or, respectively perpendicular to axis 6.

In FIGS. 22g to 22l, various examples of a particularly advantageous embodiment have been illustrated, according to which the tube comprises at least one shaped strip of approximately constant thickness, made from a metal strip of the "band" type, said strip being formed by shaping to exhibit the desired configuration of shaped strip, at least one of the two longitudinal edges of the strip being folded so as to form one of the faces of a hollow channel of approximately closed shape.

The examples illustrated in FIGS. 22g, 22h and 22j correspond to direct hollow channels, a middle cylindrical bearing surface of the shaped strip being extended to that its end constitutes a first side of hollow channel 7 formed by the shaping of the band.

In the example illustrated in FIG. 22g, the end of the lateral edge of the shaped band forming the fourth side (or free edge) of hollow channel 7 is placed perpendicular to the cylindrical bearing surface and thus constitutes the radial reinforcement element of the tube described above as being the first radial face of hollow channel 7, placed on the side of the central part of the shaped strip.

In the examples illustrated in FIGS. 22h and 22i, the end of the lateral edge of the shaped band forming the free edge of hollow channel 7 is folded so as to be a tangential support on the cylindrical bearing surface, toward the inside and, respectively, toward the outside of hollow channel 7.

In FIGS. 22j, 22k and 22l, inverted hollow channels 7 can be seen. For these hollow channels, instead of constituting the extension of the cylindrical surface formed by the middle bearing surface of the shaped strip, the first side of hollow channel 7 made by folding of the band at a right angle constitutes the first radial face of the hollow channel. The fourth side formed by the shaping of the band and providing the closing of hollow channel 7 constitutes one of the two cylindrical faces of the hollow channel.

In the advantageous example illustrated in FIG. 22k, the end of the wall closing hollow channels 7 comes to rest tangentially on the middle cylindrical bearing surface. In the example illustrated in FIG. 22l, the end of the wall closing hollow channels 7 is folded and is in tangential support on the first side of hollow channel 7.

The hollow channel illustrated in FIGS. 7 to 14, 16 and 21 comprises direct type hollow channels.

The tubes illustrated in FIGS. 16 and 17 to 20 comprise inverted hollow channels.

When the tube is made by shaping of a band, it is advantageous to maintain the curvature at any point of the shaped strip below a certain limit to avoid the deterioration of the material that can, in particular, result in a risk of premature corrosion. In practice, it is recommended that the average radius of curvature at the places where the curvature is the greatest be at least equal to 1.5 times the thickness of the band, the average radius of curvature being defined by the line in the middle of the thickness of the band (as illustrated in FIG. 24c).

The proportions characterizing the shaped strips seen in section can vary as a function, in particular, of the configuration selected and of the mechanical strength desired, as well as of the production process used in the manufacture.

Preferably, the ratio h/e between total thickness h of casing 1 in the radial direction and thickness e of the wall, in the case of shaped strips consisting of one band, can be equal to between about 4 and about 15, and, advantageously, between 5 and 12. In the case, for example, of the variants illustrated by FIGS. 5 and 6, it can be equal, typically, to between 7 and 10.

Preferably, ratio l/h between total width 1 of the shaped strip and its total height h can be equal to between 1.5 and 6. Typically, it can be equal to between 3 and 5 in the case, for example, of the variants illustrated by FIGS. 5 and 6, and between 2 and 3.5 in the case, for example, of FIGS. 7 or 8 and 12.

In FIG. 23, various means can be seen that prevent the displacement of the end of the lateral edge of the shaped band, which constitutes the free edge providing the closing of hollow channel 7, said free edge being able to constitute a radial element of the tube (direct hollow channel), or a complementary cylindrical bearing surface (inverted hollow channel).

In FIG. 23a, a recess 14 made in the thickness of the wall constituting a middle cylindrical bearing surface of a strip makes it possible to receive the end of the radial wall that closes hollow channels 7.

In FIGS. 23b to 23d, various examples of an advantageous embodiment have been illustrated in which the means for preventing the displacement of the lateral end of the shaped band are made in the shape of a ripple that the shaped band exhibits.

In FIG. 23b, a trough 15 is formed by outward-raised deformation of the cylindrical bearing surface of the shaped strip to receive the end of the radial wall of hollow channel 7.

In the case of FIG. 23c, trough 15 is defined by two inward-raised bulges 13 of the shaped strip.

In FIG. 23d, the case shown in FIG. 13 is illustrated. In this case, a single inward-raised bulge 13 of the shaped strip prevents the opening of hollow channel 7.

It is possible, as illustrated in FIG. 23e, to use a welding 16 to prevent the opening of hollow channels 7. For example, over the entire length of the strip, welding points are made that are spaced to secure on another part of the wall of the shaped strip the position of the lateral edge of the shaped band assuring the closing of hollow channel 7.

In a variant, a plurality of continuous welding beads, optionally in an interrupted way are made over the entire length of the shaped strip.

The welding can be performed by lap-welding, at points 16 as illustrated by FIGS. 18, 20 and 23e. In an alternative, it can be performed between two superposed sheets, as illustrated by FIGS. 19 and 21.

It has been found that, when the means for preventing the displacement of the lateral end of the shaped band are made so as to firmly secure the position of said lateral end, in particular by welding joints or welding beads 16, the result is an advantageous increase in the crushing strength of the tubes comprising shaped strips exhibiting at least one hollow channel and made by shaping of a band. The increase in the crushing strength varies as a function of the characteristics of the shaped strip, but it has been found that it is very considerable. By comparison with the cases where the end free edges closing the hollow channels remain in continuous support on a corresponding bearing surface of the shaped strip while having the possibility of being displaced under the action of the mechanical stresses exerted and of thus causing a very slight deformation of the hollow channel. For example, in the case of tubes similar to Examples 1, 2 and 3 described above, it has been found that the increase in the crushing strength obtained by securing, for example by welding, the free edge of the hollow channel varies between about 30% and about 50% as a function of the characteristics of the tube. It is thought that the explanation of this surprising result is in connection with the helical configuration of the continuous shaped strips which constitute the tube.

In FIG. 23f, a hollow channel 7 formed by a tube or a shape 22 can be seen. The tube or shape 22 is welded at point 16' to a band 17. The other end of the piece of sheet metal is welded either to another tube or shape 22 or to a radial wall similar to wall 9 of FIG. 9; it can also be folded to form such a radial wall.

The use of these tubes or shapes makes it possible to impart a very great radial rigidity to the tube according to this invention. It is possible in particular to use variable thicknesses on a periphery 58 of hollow channel 7 so as to optimize the use of the metal. In a first example of embodiment, a standard shape is used, for example in the shape of round, oval, elliptical or advantageously square or rectangular tubes welded to bands 17. This exhibits the advantage of using shapes 22 with a low cost.

In a second variant embodiment, a complete strip 11, 12 or 24 having optimized performances is made, for example by extrusion.

The tube according to this invention is characterized by the fact that the dimensions in cross section of the shaped strips are such that the tube exhibits, on the one hand, an almost zero radial play, and, on the other hand, an axial play that is compatible with the minimum radius of curvature that the flexible tubular conduit must be able to bear.

FIG. 24 illustrates, by way of examples, the relations which must be established between the dimensions of a particular variant of a shaped strip so as to meet the conditions defined above relative to axial play and to radial play.

The shaped strip illustrated in FIG. 24 exhibits an S shape comprising two hollow channels. It is similar to the variant described in FIG. 6, the section of the strip being symmetrical in relation to a central point which is the center of cross bar 23. The strip consists of a shaped band of thickness e.

The tube of FIG. 24 exhibits a zero radial play because of the simple fact that the thickness of the tubular layer consisting of the interlocking of the successive turns of the shaped strip corresponds here to height h of cross bar 23 which is equal to the sum of height d of hollow channel 7 and of thickness e of the band:

$$h=d+e$$

It will be noted that, in the case of FIG. 24, each half of a turn exhibits a double radial support on the corresponding half of the adjacent turn: support of hollow channel 7 of the first turn on trough 21 of the second turn, and support of trough 21 of the first turn on hollow channel 7 of the second turn.

It is not going outside the scope of the invention in the case where at least one of the two halves of a turn is simply resting on the adjacent turn, which corresponds, for example, to the variant illustrated in FIG. 7.

It is obviously found that it is also possible to make tubes 1 that exhibit a zero radial play in the case, for example, of shaped strips of the glasses type as illustrated by FIG. 5. If t is called the height which a hollow channel exceeds in relation to the bottom of adjacent trough 21 belonging to the same strip, it is enough that the hollow channels of the 2 complementary bands 11 and 12 exhibit identical values of height t.

The axial play is determined by the possible amplitude of the axial travel between two adjacent turns as a function of the respective positions of their axial interlocking radial bearing surfaces, and depends therefore on the maximum amplitude of the variation of spiral winding pitch P between minimum pitch P mini and maximum pitch P maxi.

Figure 24A:
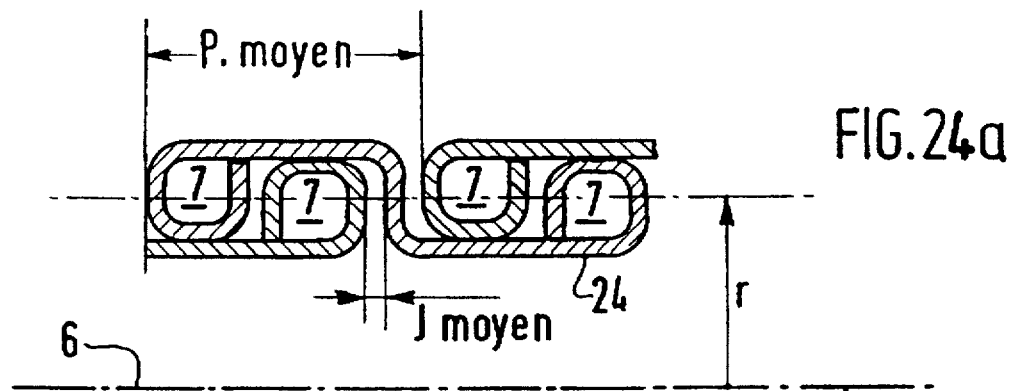
FIGS. 24 (a–c) is an explanatory diagram.

FIG. 24a shows two adjacent turns in relative position corresponding to average pitch P average. The same turns are shown at minimum pitch in FIG. 24b and at maximum pitch in FIG. 24c.

Thus, the average axial play J average can be defined:

$$J \text{ average}=\tfrac{1}{2}(P \text{ maxi}-P \text{ mini})$$

and the relative average play j of the casing:

$$j=J \text{ average/Pitch average with } P \text{ average}=\tfrac{1}{2}(P \text{ maxi}+P \text{ mini})$$

The role of relative average play j of the tube is very important, since it determines the minimum radius of curvature R mini that the flexible tubular conduit can take, as a function of the average radius r of the tube, according to the following formula:

$$R \text{ mini}=1/j \times r$$

with radius of curvature R of the conduit computed from axis 6 of the conduit, and average radius r of the tube computed from mid-thickness of the tubular layer formed by the interlocking of the turns. The relative average play therefore determines the flexibility of the flexible tubular conduit.

Figure 24B:
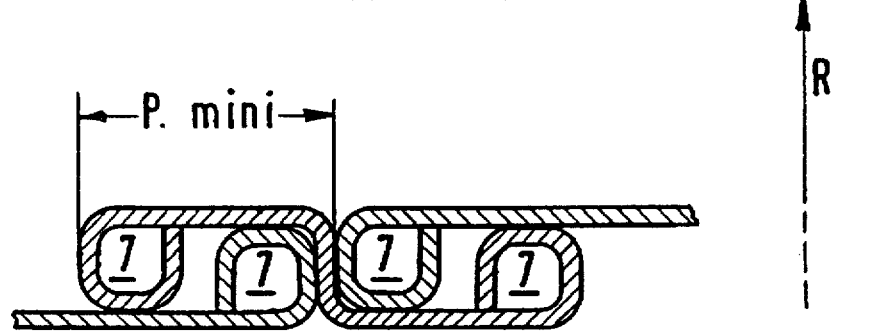
Figure 24C:
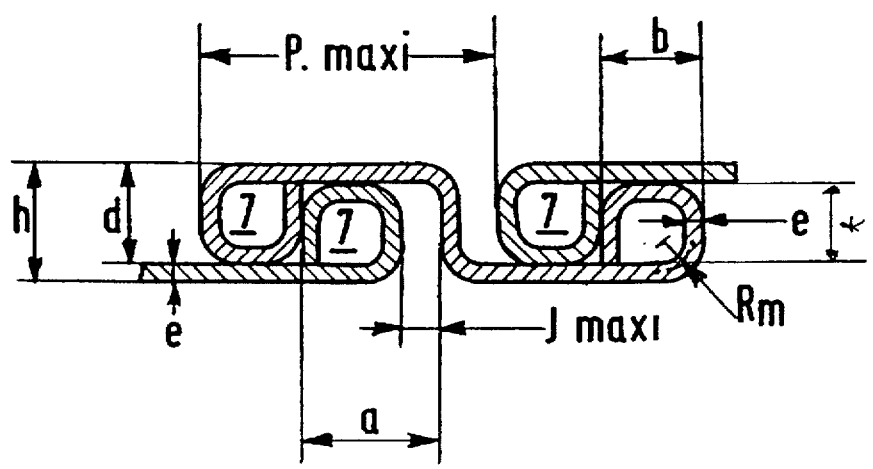

It is also possible to see that the average axial play J average (FIG. 24a) is equal to half of the maximum axial play J maxi (FIG. 24c), the axial play being zero in the case of the minimum pitch (FIG. 24b).

In the case of FIG. 24, the average axial play J average is determined by the dimensions of the shaped strip as follows:

$$J\ average = \tfrac{1}{2} J\ maxi = \tfrac{1}{2}(a-b)$$

a being the width of trough 21 between stops, and b being the width of hollow compartment 7.

It is thus possible, in the particular case, to select the dimensions a and b of the shaped strip so as to be able to obtain the minimum radius of curvature R mini desired by the formula:

$$R\ mini = \frac{r \times (P\ maxi + P\ mini)}{a - b}$$

In practice, for the relative average play j, values of 5 to 15% are currently adopted, but lower or higher values can be adopted as a function of the particular cases of use.

Producing a tube comprising a shaped strip that does not exhibit symmetry (for example: symmetry in relation to the middle of cross bar 23 in the case of the S-shaped profiles, or symmetry with the mid-plane of the middle cylindrical bearing surface in the cases of the profiles "in the shape of glasses") does not go outside the scope of this invention.

Tubes 1 according to this invention are advantageously produced with metal materials for example of stainless steel, carbon steel, light alloy comprising aluminum and/or magnesium or of composite materials such as an aluminum alloy comprising fibers.

To produce casing 1, it is possible simply, according to a known process, to use a plurality of bending rollers to bend the shaped strip while imparting to it a circular shape with a radius equal to that of the flexible tubular conduit which must be produced, while performing the fitting of the successive turns in one another. The bending rollers are placed circumferentially around axis 6 of the conduit to be formed, their axis being parallel to axis 6.

The shaped strip is introduced into the device consisting of the bending rollers while exhibiting an angle of incidence relative to the axis of the device which corresponds to the spiral winding angle of the shaped strip around axis 6 once the tube is assembled, this spiral winding angle being large, on the order of 80° to nearly 90°.

To produce great lengths of tube continuously, a plate is used that rotates around a preferably horizontal axis. The bending rollers are installed on the rotating plate around its axis. The shaped strip can be placed wound on a supply reel, this reel being mounted loose around a pin solid with the rotating plate. It is advantageous that said axis of rotation of the supply reel is placed on the rotating plate while exhibiting an angle relative to the plate corresponding to the spiral winding angle of the shaped strip. Alternatively, the supply reel can be mounted outside the rotating plate, on a rotating support that is preferably in synchronism with the plate.

According to a variant of the process for producing the tube, a band of great length is used that is wound on a supply reel which can be installed, as described above, on the rotating plate or on a rotating support that is integral with the plate. Since the band is thus unwound in the shape of a plane strip, it is formed by shaping so as to exhibit the section defined for the shaped strip by means of a plurality of pairs of shaping rollers. The band thus passes successively between the two rollers of each pair, the profiles of the active outside parts of the rollers being designed so as to provide the gradual deformation of the band, according to a technique well known in the art.

Figure 25:
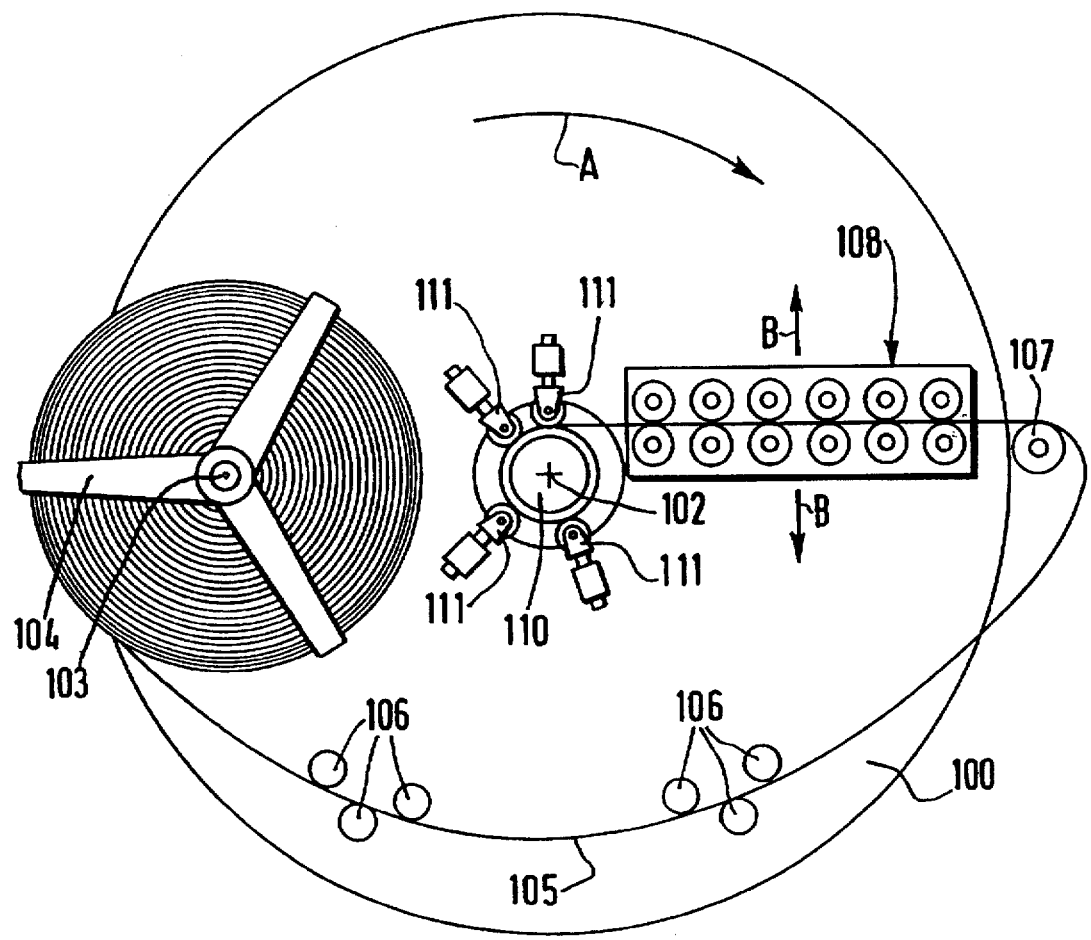
FIG. 25 is a diagrammatic view of a first example of device able to be used for the spiral winding of the tube according to this invention.

It is thus possible to use the device described in French patent 83.19474 published under No. 2,555,920 and as illustrated in FIG. 25. This device comprises a circular plate 100 rotating according to arrow A around a horizontal axis 102 by drive means not shown. In the example of embodiment illustrated in FIG. 25, plate 100 comprises an element 103 for supporting a supply reel 104 for feeding of flat band 105. Of course, the use of reels 104 that are not integral with plate 100 does not go outside the scope of this invention. Flat band 105 is unwound from reel 104 and is guided by a set of guide rollers 106, then by a return mechanism 107 through a unit 108, intended to impart the desired shape to the band, particularly comprising hollow channels 7. In a nonlimiting example, unit 108 comprises two units exhibiting for example six motorized shaping rollers, the units being able to be separated from one another as diagrammed by arrows B in FIG. 25.

Furthermore, unit 108 can be displaced by translation in the plane of plate 100 so that the band leaving the unit of shaping rollers is placed tangentially relative to the outside surface of spindle 110. The shaped band leaving roller unit 108 is applied to the periphery of the spindle, for example, by a plurality of bending rollers 111 distributed around spindle 110.

The device illustrated by FIG. 25 can be used in the case where tube 1 consists of a single strip, for example the S-shaped strip illustrated by FIG. 6, or FIGS. 7, 8, 13, 14, 15, 18 or 24. In a variant that is not illustrated, it is possible to change the relative positions of reel 104 and of shaping device 108 as well as guide elements 106 and 107, so as to place, for example, two supply reels 104 diametrically opposite relative to axis 102, and, in the same way, two shaping devices 108 in a diametral direction that is nearly at right angles to the direction defined by reels 104. Thus, it is possible to produce a tube comprising two strips, in particular in the case of two shaped strips exhibiting complementary profiles, as illustrated by FIGS. 5, 9, 10, 11, 16, 17, 19 or 21, or further, in the case of a tube comprising a shaped strip in the shape of glasses and a complementary U-shaped strip without hollow channel as illustrated in FIG. 12 or 20. Such a device makes it possible, in a variant, to produce tube 21 with a layer consisting of two shaped strips in the shape of an S, the two strips being spirally wound simultaneously, each turn of a strip being framed by two turns of the other strip.

Figure 26:
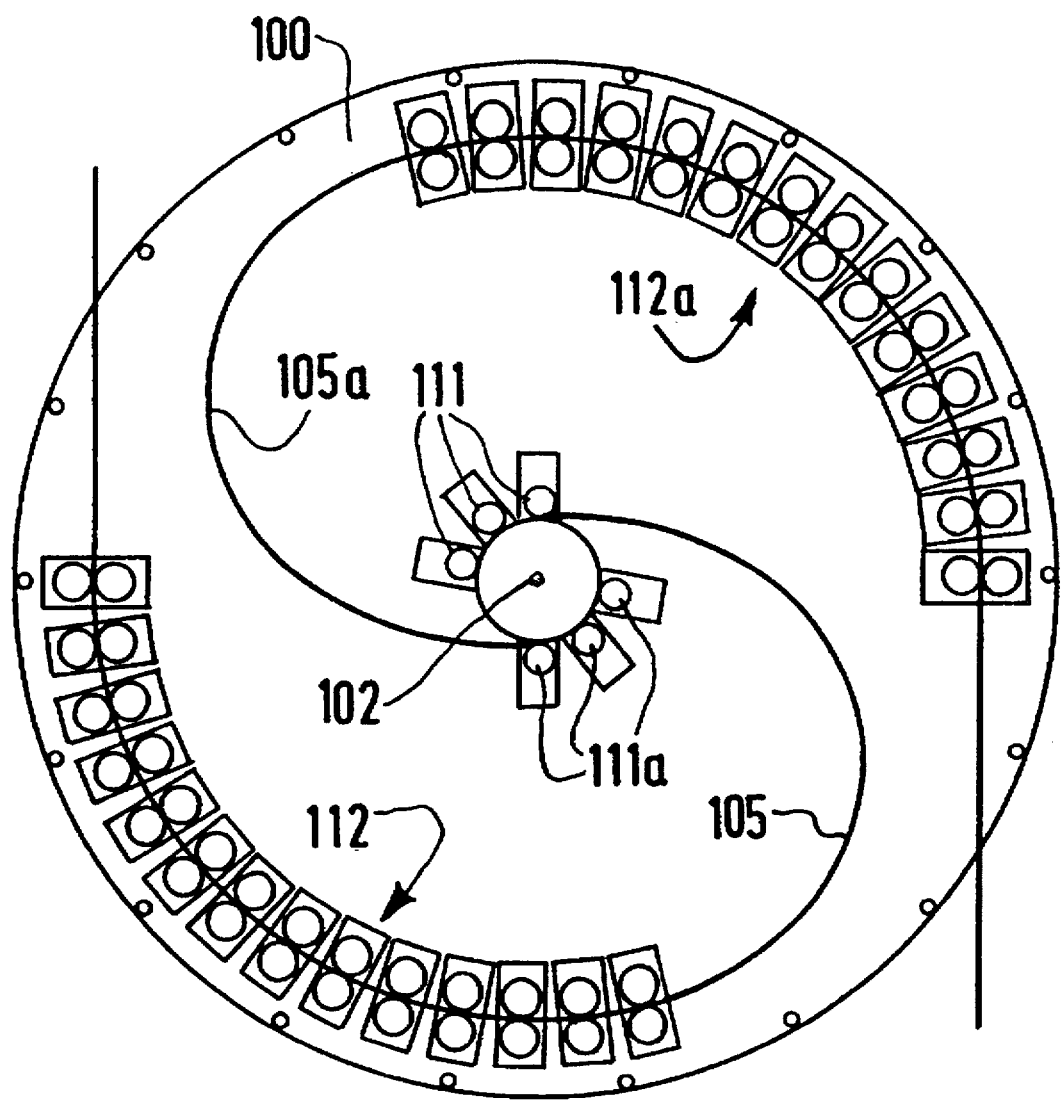
FIG. 26 is a diagrammatic view of a second example of device able to be used for the spiral winding of the tube according to this invention.

In a variant embodiment of the device for producing tube 1 illustrated by FIG. 26, two flat bands 105 and 105a are formed by shaping by passing through shaping rollers grouped in pairs and forming two shaping units 112 and 112a that are symmetrical relative to axis 102. Shaping units 112 and 112a form approximately two arcs on the periphery of rotating plate 100, which makes it possible to increase the dimensions, and in particular the diameter of tube 1, or to use a plate 100 that is less bulky or to increase the number of shaping rollers. Two series of bending rollers 111 and 111a are placed symmetrically around axis 102. Bands 105 and 105a are wound on two supply reels 104 and 104a which are mounted loose on supports (not shown) mounted away from plate 100 on a frame that can rotate around axis 102. It is advantageous to place the two reels 104 and 104a coaxially, one behind the other, around axis 102, on the other side of the produced length of tube 1 relative to plate 100. A device exhibiting these characteristics is described in U.S.

Pat. No. 4,783,980. The device illustrated by FIG. 26 is particularly advantageous for producing tubes with large dimensions. It can be improved by placing four supply reels coaxially behind one another. Two reels are used for band 105 with a first "active" reel used to supply the quantities of band 105 routed toward plate 100, and the second "inactive" reel being able to be loaded with a new length of band 105 so as to be able to become active in turn and assume the relay of the first reel when the latter is emptied and must, in turn, proceed to an inactive position to be reloaded. The other two reels operate according to the same conditions with the other band 105a. The production device illustrated by FIG. 26 can, in a variant, be equipped so as to work with a single band to produce a tube 1 consisting of a single shaped strip.

Generally, in the cases where the position of the end of the lateral edge of the band must be secured by welding points or by welding beads, including by a continuous welding, the welding can be performed by installing a piece of automatic welding equipment on plate 100, between shaping rollers 108 or 112/112a and bending rollers 111/111a, the welding being able to be performed by lap-welding or between superposed sheet metal pieces.

Of course, the use of the automatic welding equipment according to the invention, placed on plate 100 between the shaping elements of a band and the bending elements, is not limited to the welding of the hollow channels.

In a different embodiment of the device for producing tube 1, the shaped strip is produced beforehand. It is thus possible, for example, to produce the shaped strip in a preliminary operation, the flat band being formed by having it pass through a plurality of pairs of shaping rollers mounted in line on a stationary frame, and the shaped strip thus produced being stored by winding it as it goes on a reel. If applicable, the shaping operation is completed by the simultaneous performing of welding points or of welding beads 16.

Alternatively, instead of being produced by shaping from a flat band, the shaped strip can be produced, prior to the final spiral winding operation of the tube, from previously produced shapes or tubes 22, in particular from products available on the market; the elements of shapes or tubes 22 being welded to the ends of one another can be connected by a continuous or discontinuous longitudinal welding 16' to a band 17 to constitute the shaped strip, the band being able, further, to be connected by welding along its other edge to other shapes or tubes 22.

The shaped strip having thus been produced previously by one or the other of the above processes, or any other known process that can be used, and having been wound on a reel in a continuous length which can correspond to the total length or to a part of the length of tube 1 to be produced, it can then be transported to be used by the spiral winding device, currently designated by the name spiral winder. In a first embodiment, the shaped strip is placed on the rotating plate of the spiral winder, similar to plate 100 of FIG. 25, the shaping unit 108 not being installed. Alternatively, the strip is mounted on a support separated from rotating plate 100 of the spiral winder, said separated support being able to rotate around axis 102 of spiral winding plate 100; in the case where tube 1 is produced by using two previously produced shaped strips, it is possible, in particular, to use a device similar to the one illustrated by FIG. 26, shaping devices 112 and 112a not being installed on plate 100. The supply reel supporting the shaped strip and installed on plate 100 or on a rotating support can be the storage reel on which the strip had wound as it was produced in a preliminary phase, or else the shaped strip can have been transferred from the storage reel to a particular supply reel.

Figure 27:
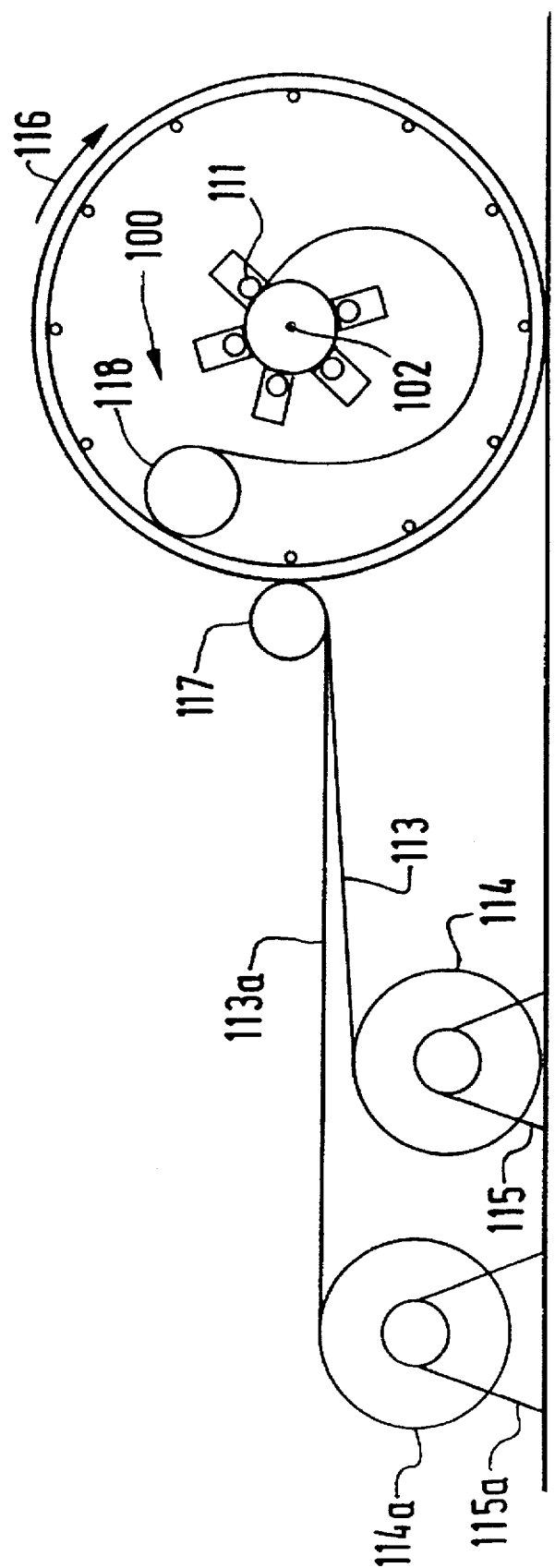
FIG. 27 is a diagrammatic view of a third example of device able to be used for the spiral winding of the tube according to this invention.

In a second embodiment, the shaped strip is wound on a stationary supply reel which can rotate around a pin carried by a stationary frame, and not around a pin carried by plate 100 or by a rotating support. In an advantageous variant, it is possible to use a spiral winding device as described in U.S. Pat. No. 4,895,011. An example of such a device is illustrated by FIG. 27 which corresponds to the case of a tube 1 produced from two shaped strips 113 and 113a. Shaped strips 113 and 113a are wound on two stationary supply reels 114 and 114a, placed behind one another on stationary frames 115 and 115a which are installed in the same vertical plane as plate 100 of the spiral winder, so that shaped strips 113 and 113a are fully contained between two vertical planes containing approximately pressing rollers 111 placed around axis 102 of the spiral winder, and so that the parts of the shaped strip which must become the cylindrical bearing surfaces of tube 1 once the tube is formed by spiral winding remain perpendicular to said vertical planes. Since plate 100 rotates in the direction of arrow 116, the shaped strips take support around a guide pulley 117 so as to be able to be wound in a multiplicity of concentric turns on the periphery of plate 100. Shaped strips 113 and 113a are then removed from the inside of the stack of the peripheral storage turns by a return pulley 118, so as to be able to be routed toward the center of plate 100 where they are shaped by bending rollers 111 which impart to them a radius of curvature equal to the radius of tube 1 to be produced, and assure the interlocking of the successive turns. It is important to note that a first interlocking of the two shaped strips 113 and 113a is performed in the zone where they are wound around guide pulley 117, the two strips 113 and 113a remain fitted into one another over the entire length of their path on plate 100 until the final spiral winding that is performed by bending rollers 111. Under these conditions, the final interlocking of the adjacent turns which is performed by rollers 111 at the same time as the bending so as to form casing 1 with axial interlocking consists in connecting to one another the double turns formed by the assembly of the two strips 113 and 113a. As has been explained above, it is thus possible to produce tube 1, for example, both with two shaped strips with complementary profiles, for example "in the shape of glasses," and with two S-shaped strips with the same section constituting a single layer of interlocked turns. It is obvious that, by simplifying the device described above, it is easily possible to produce tube 1 from a single shaped strip, in particular in the shape of an S.

In a different embodiment of the device for producing tube 1, it is also possible to perform the spiral winding with interlocking of the successive turns of shaped strip by placing at least one bending roller on the inside of the cylindrical surface that the successive turns define once the shaped strip is bent to the desired radius by the action of the bending rollers. In this case, the spirally wound strip thus passes between a row of outside rollers forming approximately an arc and at least one inside roller, tube 1 thus formed leaving freely without being positioned around an inside spindle centered on axis 102.

Generally, it has been found that, in addition to its relative ease of use, tube 1 according to the invention exhibits the advantage that the section of the shaped strip is produced completely and finally once it has been made by shaping of a band or any other process, and this, whether this operation for forming the shaped strip is performed at the same time as the spiral winding on the device used for the spiral winding of tube 1, or whether it has been performed separately by a previous operation. It results that the spiral winding and interlocking of the turns of tube 1 are performed by bending rollers 111 without any modification of the shape of the shaped strips, in particular, without any plastic deformation of the section, which constitutes an appreciable advantage in comparison with the production of known tubes, in particular S-shaped casings currently used to produce high strength flexible tubular conduits intended, in particular, for offshore oil production installations.

It can be advantageous to fill hollow channels 7 with corrosion inhibiting agents or, for example, with oil. Other filling means such as, for example, foams or solid elements that participate in the stiffening of casing 1 do not go outside the scope of this invention.

Flexible tubular conduits according to this invention apply particularly to the transport of fluids, such as for example water or hydrocarbons.

The tube according to the invention can also be used for the outside protection of elongated bodies such as cables, particularly electric cables.

We claim:

1. A flexible metallic tube having an axis, comprising at least one interlocking shaped strip having a continuous section and substantially constant thickness and being spirally wound around said axis, said at least one interlocking strip comprising a central part and two lateral interlocking parts, wherein said tube comprises two hollow closed channels spirally wound about said axis and formed by walls belonging to a same turn of said at least one shaped strip wherein said two hollow closed channels are defined by one of said two lateral interlocking parts.

2. A flexible metallic tube according to claim 1, wherein said hollow closed channel (7) has an approximately rectangular section.

3. A flexible metallic tube according to claim 1, wherein said flexible metallic tube is composed of two complimentary layers (11, 12) respectively, each layer comprising at least one of said shaped strip.

4. A flexible metallic tube according to claim 3, wherein each layer (11, 12) comprises at least one shaped strip comprising at least one hollow channel (7).

5. A flexible metallic tube according to claim 3, wherein said flexible metallic tube comprises a single layer comprising at least one hollow closed channel (7) and a layer (11') that does not comprise a hollow closed channel.

6. A flexible metallic tube according to claim 1, wherein said flexible metallic tube comprises at least one strip (24) in the shape of an S.

7. A casing according to claim 1, wherein said casing comprises, at leasst one of its ends, an edge (9) that is approximately rdial in relation to the casing.

8. A flexible metallic tube according to claim 7, wherein approximately radial edge (9) rests on a main bearing surface (12) of a strip forming the flexible metallic tube.

9. A flexible metallic tube according to claim 1, wherein said flexible metallic tube comprises at least one strip comprising a hollow channel (7) at each of two ends of said strip.

10. A flexible metallic tube according to claim 1, wherein said flexible metallic tube comprises means (13, 16) to prevent the displacement of the ends of strips forming the hollow closed channel.

11. A flexible metallic tube according to claim 10, wherein said flexible metallic tube further comprises welding elements (16, 16') closing hollow closed channel (7) at least locally.

12. A flexible tubular conduit according to claim 1, wherein said conduit comprises an inner sealing sleeve, said flexible metallic tube being placed inside said inner sealing sleeve, said flexible metallic tube preventing the crushing of the flexible tubular conduit.

13. A flexible tubular conduit according to claim 1, wherein said conduit comprises an inner sealing tube or sleeve, said flexible metallic tube being placed outside of said inner sealing tube or sleeve, constituting an armoring layer to withstand internal pressure.

14. A flexible tubular conduit according to claim 1, wherein said flexible metallic tube constitutes an outside protective armor of said flexible tubular conduit.

* * * * *